United States Patent
Lim et al.

(10) Patent No.: US 10,146,091 B2
(45) Date of Patent: Dec. 4, 2018

(54) DISPLAY APPARATUS

(71) Applicant: Samsung Display Co., Ltd., Yongin-si (KR)

(72) Inventors: Namjae Lim, Gwacheon-si (KR); Jai-Hyun Koh, Hwaseong-si (KR); Sungjae Park, Wonju-si (KR); Ik Soo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 428 days.

(21) Appl. No.: 14/884,144

(22) Filed: Oct. 15, 2015

(65) Prior Publication Data

US 2016/0116807 A1    Apr. 28, 2016

(30) Foreign Application Priority Data

Oct. 22, 2014 (KR) .................. 10-2014-0143469

(51) Int. Cl.
*G02F 1/1343* (2006.01)
*G02F 1/1362* (2006.01)
*G09G 3/36* (2006.01)

(52) U.S. Cl.
CPC .. *G02F 1/134309* (2013.01); *G02F 1/136286* (2013.01); *G09G 3/3607* (2013.01);
(Continued)

(58) Field of Classification Search
CPC ......... G02F 1/134309; G02F 1/136286; G02F 2001/134345; G09G 3/3607;
(Continued)

(56) References Cited

U.S. PATENT DOCUMENTS 8,587,504 B2    11/2013  Joo
8,638,324 B2    1/2014   Lee et al.
(Continued)

FOREIGN PATENT DOCUMENTS

KR    10-2007-0028744    3/2007
KR    10-2008-0050853    6/2008
(Continued)

OTHER PUBLICATIONS

European Search Report dated Mar. 1, 2016, in European Application No. 15 19 0197.

*Primary Examiner* — Aneeta Yodichkas
(74) *Attorney, Agent, or Firm* — H.C. Park & Associates, PLC

(57) ABSTRACT

A display apparatus includes gate lines extending in a first direction, data lines crossing the first direction and having polarities of data voltages consecutively repeated every four data lines, and pixels which each comprise three sub-pixels. One of the three sub-pixels has a width in the first direction different from a width in the first direction of another sub-pixel of the three sub-pixels. Each of the three sub-pixels is connected to a corresponding gate line and a corresponding data line. The polarities of the data voltages applied to a first data line and a third data line are opposite and the polarities of the data voltages applied to a second data line and a fourth data line are opposite. The pixels arranged between two adjacent data lines among the plurality of data lines are alternately connected to the two adjacent data lines.

7 Claims, 23 Drawing Sheets

(52) U.S. Cl.
CPC ............. *G09G 3/3614* (2013.01); *G02F 2001/134345* (2013.01); *G09G 2300/0426* (2013.01); *G09G 2300/0452* (2013.01); *G09G 2300/0465* (2013.01); *G09G 2340/06* (2013.01)

(58) Field of Classification Search
CPC ............. G09G 3/3614; G09G 2340/06; G09G 2300/0465; G09G 2300/0452; G09G 2300/0426
See application file for complete search history.

(56) References Cited

U.S. PATENT DOCUMENTS

| | | |
|---|---|---|
| 8,810,490 B2 | 8/2014 | Moon et al. |
| 2007/0052658 A1 | 3/2007 | Kim |
| 2010/0225570 A1* | 9/2010 | Liu ............. G09G 3/3614 345/92 |
| 2013/0135845 A1* | 5/2013 | Matsui ............. G09F 13/04 362/97.1 |
| 2014/0204072 A1 | 7/2014 | Yamauchi et al. |
| 2014/0232624 A1* | 8/2014 | Kim ............. G09G 3/3696 345/87 |

FOREIGN PATENT DOCUMENTS

| | | |
|---|---|---|
| KR | 10-2011-0077899 | 7/2011 |
| KR | 10-2013-0000997 | 1/2013 |
| KR | 10-2014-0006490 | 1/2014 |

\* cited by examiner

![US 10,146,091 B2]

DISPLAY APPARATUS

CROSS-REFERENCE TO RELATED APPLICATION

This application claims priority from and the benefit of Korean Patent Application No. 10-2014-0143469, filed on Oct. 22, 2014, which is hereby incorporated by reference for all purposes as if fully set forth herein.

BACKGROUND

Field

The present disclosure relates to a display apparatus. More particularly, the present disclosure relates to a display apparatus operated in an inversion driving scheme.

Discussion of the Background

A liquid crystal display applies an electric field to a liquid crystal layer interposed between two substrates to change an alignment of liquid crystal molecules of the liquid crystal layer. Accordingly, a transmittance of light incident to the liquid crystal layer is controlled, and thus a desired image is displayed in the liquid crystal display.

The liquid crystal display is operated in various driving methods, such as a line inversion method, a column inversion method, a dot inversion method, etc., which are distinguished from each other in accordance with a phase of data voltages applied to data lines. The line inversion method inverts the phase of the image data applied to the data lines every pixel row, the column inversion method inverts the phase of the image data applied to the data lines every pixel column, and the dot inversion method inverts the phase of the image data applied to the data lines every pixel row and column.

In general, a display apparatus displays colors using three primary colors of red, green, and blue colors. Therefore, a display panel employed in the display apparatus includes sub-pixels respectively corresponding to the red, green, and blue colors.

In recent years, a display apparatus displaying the colors using other primary colors in addition to the red, green, and blue colors has been developed. The additional primary colors are magenta, cyan, yellow, and white colors. In addition, a display apparatus configured to include red, green, blue, and white sub-pixels has been suggested to improve brightness of the image displayed in the display apparatus. Red, green, and blue image signals from an external source are converted to red, green, blue, and white data signals, and then provided to the display panel. However, these displays suffer from a moving line stain phenomenon (i.e., when a vertical line seems to move across a display) and a horizontal cross talk phenomenon (i.e., contrast differences in some areas of a display).

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus capable of improving a moving line-stain phenomenon and a horizontal crosstalk phenomenon.

Additional aspects will be set forth in the detailed description which follows, and, in part, will be apparent from the disclosure, or may be learned by practice of the inventive concept.

An exemplary embodiment discloses a display apparatus including a plurality of gate lines extending in a first direction, a plurality of data lines extending in a second direction crossing the first direction and configured to receive polarities of data voltages consecutively repeated every four data lines, and a plurality of pixels each comprising three sub-pixels. One sub-pixel of the three sub-pixels has a width in the first direction different from a width of another sub-pixel of the three sub-pixels in the first direction. Each of the three sub-pixels are connected to a corresponding gate line of the plurality of gate lines and a corresponding data line of the plurality of data lines. The polarities of the data voltages applied to a first data line and a third data line of the four data lines are opposite polarities and the polarities of the data voltages applied to a second data line and a fourth data line of the four data lines are opposite polarities. In addition, the pixels arranged between two adjacent data lines among the plurality of data lines are alternately connected to the two adjacent data lines.

An exemplary embodiment also discloses a display apparatus including a plurality of gate lines extending in a first direction, a plurality of data lines extending in a second direction crossing the first direction and configured to receive polarities of data voltages consecutively repeated every twelve data lines, and a plurality of pixels each comprising three sub-pixels. One sub-pixel of the three sub-pixels has a width different from a width of another sub-pixel of the three sub-pixels in the first direction. Each of the three sub-pixels are connected to a corresponding gate line of the plurality of gate lines and a corresponding data line of the plurality of data lines. The polarities of the data voltages applied to a first data line and a seventh data line of the twelve data lines are opposite polarities. The polarities of the data voltages applied to a second data line and an eighth data line of the twelve data lines are opposite polarities. The polarities of the data voltages applied to a third data line and a ninth data line of the twelve data lines are opposite polarities. The polarities of the data voltages applied to a fourth data line and a tenth data line of the twelve data lines are opposite polarities. The polarities of the data voltages applied to a fifth data line and an eleventh data line of the twelve data lines are opposite polarities. The polarities of the data voltages applied to a sixth data line and a twelfth data line of the twelve data lines are opposite polarities. The pixels arranged between two adjacent data lines among the plurality of data lines are alternately connected to the two adjacent data lines.

An exemplary embodiment also discloses a display apparatus including a plurality of gate lines extending in a first direction, a plurality of data lines extending in a second direction crossing the first direction receiving data voltages having at least one of a positive polarity and a negative polarity, and a plurality of pixels each comprising three sub-pixels. One sub-pixel of the three sub-pixels has a width different from a width of another sub-pixel of the three sub-pixels in the first direction. Each of the three sub-pixels is connected to a corresponding gate line of the plurality of gate lines and a corresponding data line of the plurality of data lines. Among first color sub-pixels connected to one gate line of the plurality of gate lines and displaying a first color, a number of the sub-pixels applied with a positive data voltage is equal to a number of the sub-pixels applied with a negative data voltage. Two adjacent first color sub-pixels receive at least one of the data voltages having the same polarity.

An exemplary embodiment also discloses a display apparatus including a plurality of gate lines extending in a first direction, a plurality of data lines extending in a second direction crossing the first direction and configured to receive polarities of data voltages consecutively repeated every four or more data lines, a first pixel, and a second pixel disposed adjacent to the first pixel in the first and second directions. The first pixel comprises a first sub-pixel, a second sub-pixel, and a third sub-pixel sequentially arranged. The third sub-pixel has a width greater than a width of each of the first and second sub-pixels in the first direction. The first sub-pixel displays a red color, the second sub-pixel displays a green color, and the third sub-pixel displays a blue color. The second pixel comprises a fourth sub-pixel, a fifth sub-pixel, and a sixth sub-pixel sequentially arranged. The sixth sub-pixel has a width greater than a width of each of the fourth and fifth sub-pixels in the first direction. The fourth sub-pixel displays the red color, the fifth sub-pixel displays the green color, and the sixth sub-pixel displays a white color.

According to the above, the horizontal crosstalk phenomenon and the moving line-stain phenomenon may be improved.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
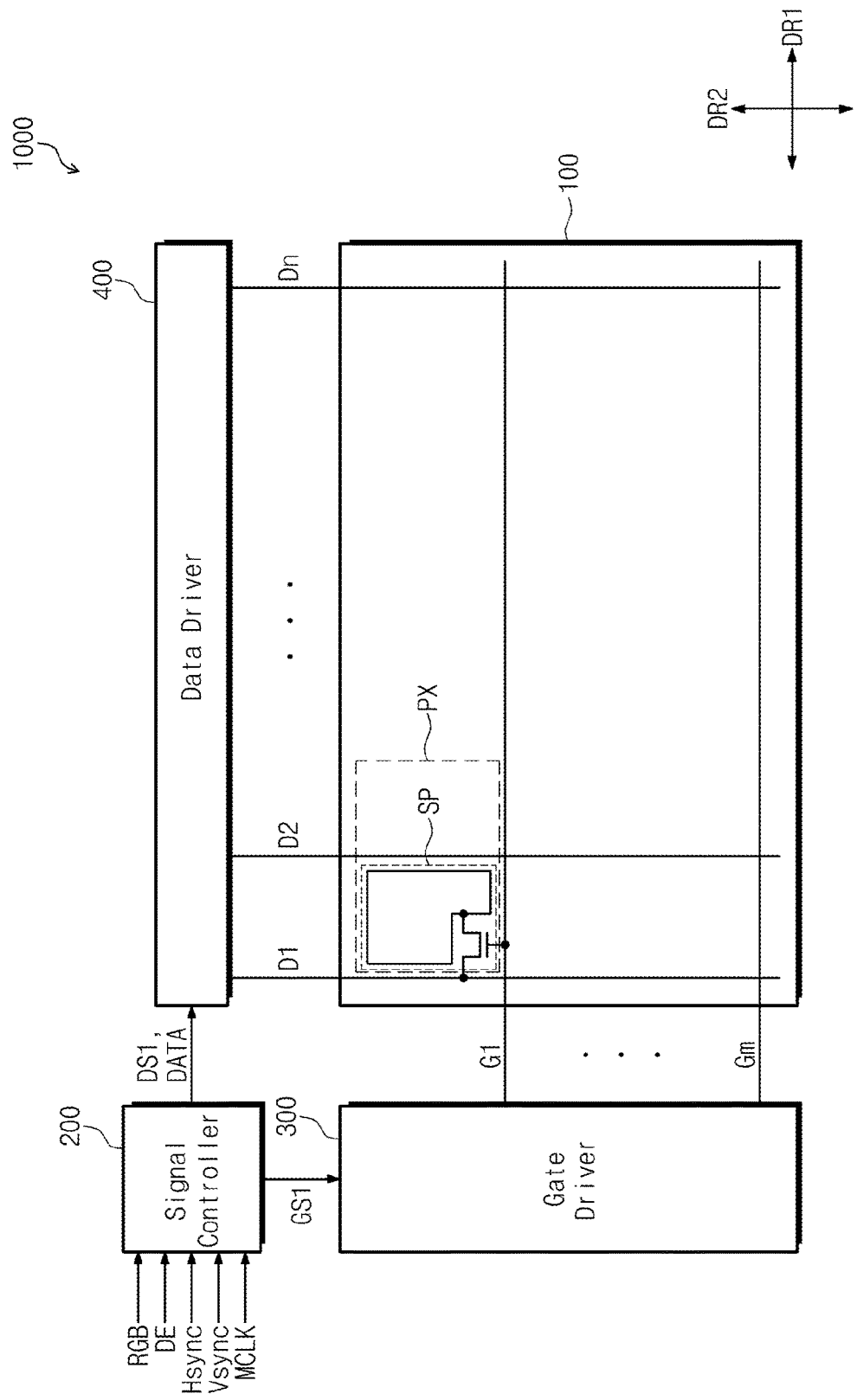
FIG. 1 is a block diagram showing a liquid crystal display according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the present invention will be explained in detail with reference to the accompanying drawings.

Figure 2:
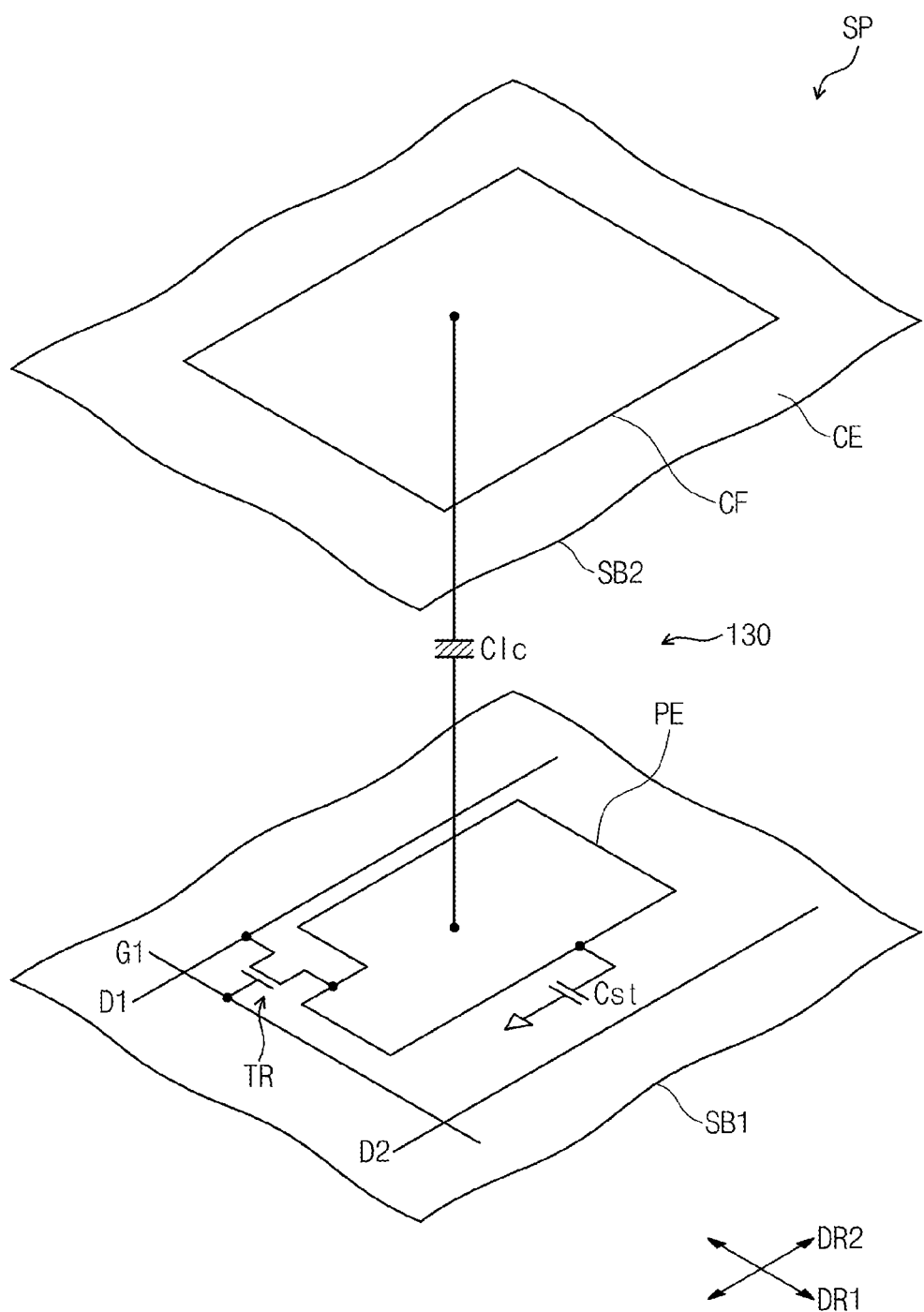
FIG. 2 is an equivalent circuit diagram of one pixel shown in FIG. 1.

FIG. 1 is a block diagram showing a liquid crystal display 1000 according to an exemplary embodiment. FIG. 2 is an equivalent circuit diagram of one pixel shown in FIG. 1.

Referring to FIGS. 1 and 2, the liquid crystal display 1000 includes a liquid crystal display panel 100, a signal controller 200, a gate driver 300, and a data driver 400.

The liquid crystal display panel 100 includes a lower substrate SB1, an upper substrate SB2, and a liquid crystal layer 130 interposed between the lower substrate SB1 and the upper substrate SB2.

The liquid crystal display panel 100 includes a plurality of gate lines G1 to Gm extending in a first direction DR1, a plurality of data lines D1 to Dn extending in a second direction DR2 crossing the first direction DR1, and a plurality of pixels PX. Each pixel PX includes a plurality of sub-pixels SP. Although FIG. 1 only shows one pixel PX configured with one sub-pixel SP as a representative example, each pixel PX is configured to include at least three sub-pixels SP.

Although FIGS. 1 and 2 show only one sub-pixel SP connected to a first gate line G1 and a first data line D1, each sub-pixel SP is connected to a corresponding gate line of the gate lines G1 to Gm and a corresponding data line of the data lines D1 to Dn.

The sub-pixel SP includes a thin film transistor TR connected to a corresponding gate line of the gate lines G1 to Gm, a liquid crystal capacitor Clc connected to the thin film transistor TR, and a storage capacitor Cst connected to the liquid crystal capacitor Clc in parallel. The storage capacitor Cst may be omitted if necessary. The thin film transistor TR is disposed on the lower substrate SB1. The thin film transistor TR includes a gate electrode connected to the first gate line G1, a source electrode connected to the first data line D1, and a drain electrode connected to a pixel electrode PE. The drain electrode is electrically connected to the liquid crystal capacitor Clc and the storage capacitor Cst through the pixel electrode PE.

The liquid crystal capacitor Clc includes the pixel electrode PE disposed on the lower substrate SB1 and a common electrode CE disposed on the upper substrate SB2 as its two electrodes, and the liquid crystal layer 130 interposed between the pixel electrode PE and the common electrode CE serves as a dielectric substance. The pixel electrode PE is connected to the thin film transistor TR, and the common electrode CE is disposed over an entire surface of the upper substrate SB2 and applied with a common voltage. In an alternate embodiment from the structure shown in FIG. 2, the common electrode CE may be disposed on the lower substrate SB1, and in this case, at least one of the pixel electrode PE and the common electrode CE may include slits.

The storage capacitor Cst is configured to include the pixel electrode PE, a storage line (not shown), and an insulating layer disposed between the pixel electrode PE and the storage line (not shown) to assist the liquid crystal capacitor Clc. The storage line (not shown) is disposed on the lower substrate SB1 and overlapped with a portion of the pixel electrode PE. The storage line (not shown) is applied with a constant voltage (e.g., a storage voltage).

The sub-pixel SP displays one of various primary colors. The primary colors include red, green, blue, and white colors. According to another embodiment the primary colors may further include yellow, cyan, and magenta colors. The sub-pixel SP may further include a color filter CF to display one of the primary colors. In FIG. 2, the color filter CF is disposed on the upper substrate SB2, but it should not be limited to such a position. That is, the color filter CF may alternatively be disposed on the lower substrate SB1 according to embodiments.

The signal controller 200 receives image data RGB and control signals from an external graphic controller (not shown). The control signals include a vertical synchronization signal Vsync as a frame distinction signal, a horizontal synchronization signal Hsync as a row distinction signal, a data enable signal DE maintained at a high level during a period, in which data is output to indicate a data input period.

The signal controller 200 converts a data format of the image signals RGB to a data format appropriate to an interface between the signal controller 200 and the data driver 400. The signal controller 200 applies output data DATA having the converted data format to the data driver 400.

The image data RGB includes red, green, and blue data. The signal controller 200 performs a gamut mapping algorithm (GMA) on the image data RGB to map an RGB gamut of the image data RGB to an RGBW gamut and to generate the RGBW data, which is configured to include red, green, blue, and white data. The RGBW data has red, green, blue, and white color information corresponding to each pixel PX. The signal controller 200 renders the RGBW data to generate rendering data. The rendering data has information about the red, green, blue, and white colors, which correspond to each pixel PX. The signal controller 200 generates a gate control signal GS1 and a data control signal DS1. The signal controller 200 applies the gate control signal GS1 to the gate driver 300 and applies the data control signal DS1 to the data driver 400.

The gate control signal GS1 is used to drive the gate driver 300 and the data control signal is used to control the data driver 400.

The gate driver 300 generates gate signals in response to the gate control signal GS1 and applies the gate signals to the gate lines G1 to Gm. The gate control signal GS1 includes a scan start signal to start a scan of the gate lines G1 to Gm, at least one clock signal to control an output timing of a gate-on voltage, and an output enable signal to control a time duration of the gate-on voltage.

The data driver 400 generates grayscale voltages corresponding to the image data DATA in response to the data control signal DS1. The data driver 400 converts the generated grayscale voltages to data voltages and applies the data voltages to the data lines D1 to Dn. The data voltages include a positive data voltage having a voltage level higher than the common voltage and a negative data voltage having a voltage level lower than the common voltage. The data control signal DS1 includes a horizontal start signal STH to indicate a transmission of the image data DATA to the data driver 400, a load signal to apply the data voltages to the data lines D1 to Dn, and an inversion signal to invert a polarity of the data voltages with respect to the common voltage.

The polarity of the data voltage applied to the sub-pixel SP is inverted after one frame is finished and before a next frame starts to prevent liquid crystal molecules of the liquid crystal layer 130 from burning and deteriorating. In other words, the polarity of the data voltage is inverted every one frame in response to the inversion signal applied to the data driver 400. The liquid crystal display panel 100 is operated in a line inversion driving scheme, in which the polarity of the data voltage is inverted every at least one data line when an image corresponding to one frame period is displayed, to improve a display quality thereof.

Each of the signal controller 200, the gate driver 300, and the data driver 400 is directly mounted on the liquid crystal display panel 100 in one or more integrated circuit chip package, attached to the liquid crystal display panel 100 in a tape carrier package form after being mounted on a flexible printed circuit board, or mounted on a separate printed circuit board. In an embodiment, at least one of the gate driver 300 and the data driver 400 may be directly integrated on the liquid crystal display panel 100 together with the gate lines G1 to Gm and the data lines D1 to Dn. Further, the signal controller 200, the gate driver 300, and the data driver 400 may be integrated with each other in a single chip.

Figure 3:
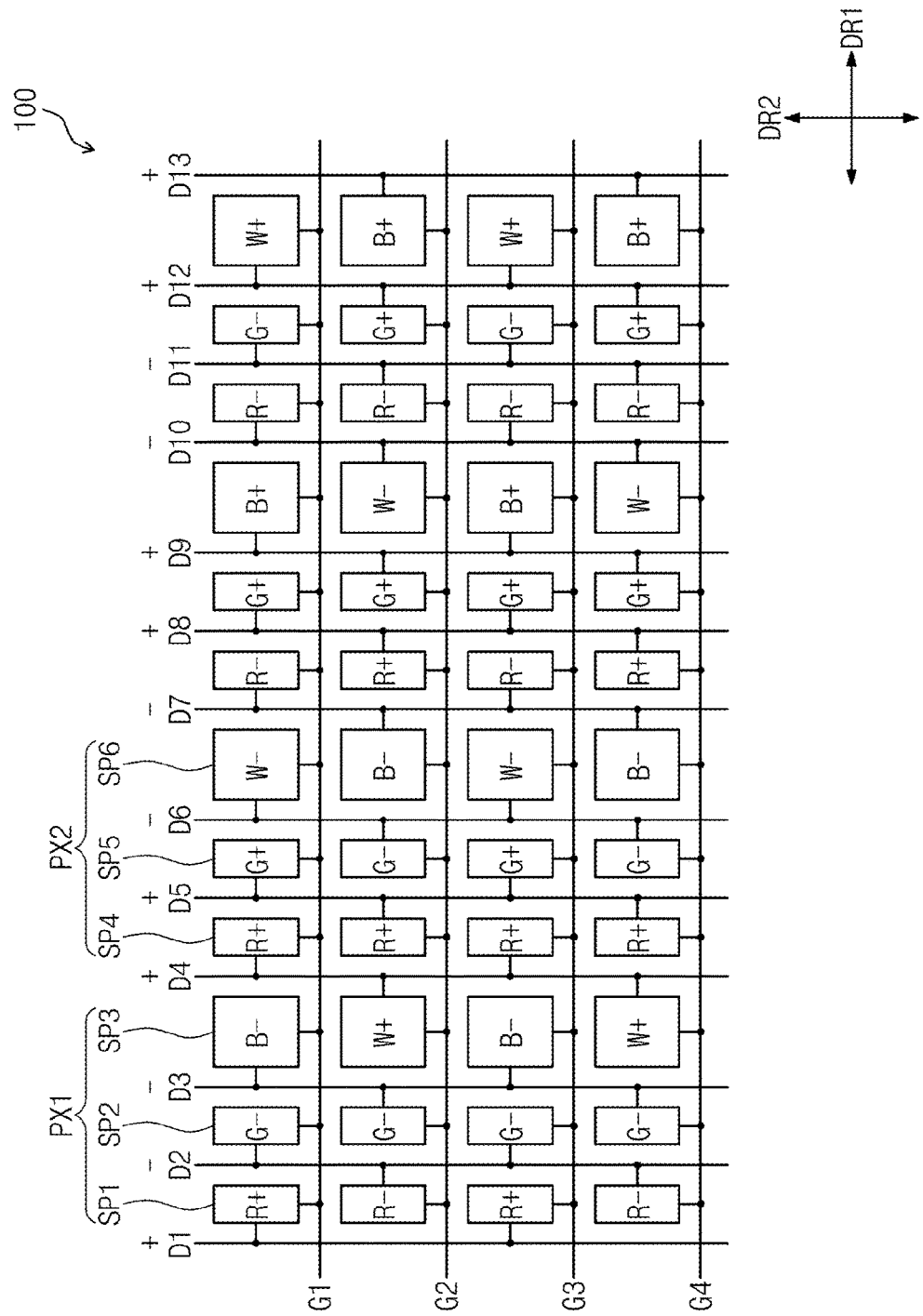
FIG. 3 is a plan view showing a portion of a liquid crystal display panel according to an exemplary embodiment.

FIG. 3 is a plan view showing a portion of a liquid crystal display panel according to an exemplary embodiment.

Referring to FIG. 3, each pixel includes three sub-pixels. The three sub-pixels have different sizes. For instance, the three sub-pixels have the same length in the second direction DR2 and one sub-pixel of the three sub-pixels has a width different from that of the other sub-pixels of the three sub-pixels in the first direction DR1.

The pixels are configured to include a first pixel PX1 and a second pixel PX2.

The first pixel PX1 displays the red, green, and blue colors and the second pixel PX2 displays the red, green, and white colors.

The first pixel PX1 includes a first sub-pixel SP1, a second sub-pixel SP2, and a third sub-pixel SP3, which are sequentially arranged in the first direction DR1. The second pixel PX2 includes a fourth sub-pixel SP4, a fifth sub-pixel SP5, and a sixth sub-pixel SP6, which are sequentially arranged in the first direction DR1.

The rendering data includes red, green, and blue data corresponding to the first pixel PX1 and includes red, green, and white data corresponding to the second pixel PX2.

The first and second pixels PX1 and PX2 are disposed adjacent to each other in the first and second directions DR1 and DR2. The first and second pixels PX1 and PX2 are alternately arranged with each other in the first and second directions DR1 and DR2.

The first and second sub-pixels SP1 and SP2 have the same width in the first direction DR1. The third sub-pixel SP3 has the width different from that of the first and second sub-pixels SP1 and SP2 in the first direction DR1. For instance, the width in the first direction DR1 of the third sub-pixel SP3 is greater than the width in the first direction DR1 of the first and second sub-pixels SP1 and SP2. The third sub-pixel SP3 is disposed at a right outermost position in the first pixel PX1 when viewed from the first direction DR1.

Similarly, the fourth and fifth sub-pixels SP4 and SP5 have the same width in the first direction DR1. The sixth sub-pixel SP6 has the width different from that of the fourth and fifth sub-pixels SP4 and SP5 in the first direction DR1. For instance, the width in the first direction DR1 of the sixth sub-pixel SP6 is greater than the width in the first direction DR1 of the fourth and fifth sub-pixels SP4 and SP5. The sixth sub-pixel SP6 is disposed at a right outermost position in the second pixel PX2 when viewed from the first direction DR1. In FIG. 3, red, green, blue, and white sub-pixels are respectively indicated by "R", "G", "B", and "W".

Each of the first and fourth sub-pixels SP1 and SP4 are the red sub-pixel, each of the second and fifth sub-pixels SP2 and SP5 are the green sub-pixel, the third sub-pixel SP3 is the blue sub-pixel, and the sixth sub-pixel SP6 is the white sub-pixel. That is, each of the blue and white sub-pixels have a width greater than that of each of the red and green sub-pixels in the first direction DR1. However, the arrangement of the sub-pixels should not be limited by such an embodiment. Instead, positions of the red and green sub-pixels may be changed with respect to one another. For instance, each of the first and fourth sub-pixels SP1 and SP4 may be the green sub-pixel and each of the second and fifth sub-pixels SP2 and SP5 may be the red sub-pixel.

In FIG. 3, the sub-pixels applied with the positive (+) data voltage during an i-th frame period ("i" is a natural number) are designated by R+, G+, B+, and W+ and the sub-pixels applied with the negative (−) data voltage during the i-th frame period are designated by R−, G−, B−, and W−.

FIG. 3 shows the polarities of the data voltages applied to the sub-pixels of the liquid crystal display panel 100 during the i-th frame period, and the polarities of the data voltages applied to the sub-pixels during an (i+1)th frame period are inverted. In other words, the data driver 400 shown in FIG. 1 inverts the polarities of the data voltages applied to the data lines D1 to Dn every frame period.

The polarities of the data voltages applied to the data lines D1 to D13 are repeated every consecutive four data lines. Hereinafter, first, second, third, and fourth data lines D1, D2, D3, and D4 will be described as a representative example. Among the four data lines D1, D2, D3, and D4, the polarities of the data voltages applied to earlier two data lines D1 and D2 are opposite to the polarities of the data voltages applied to later two data lines D3 and D4. For instance, the polarity of the data voltage applied to the first data line D1 is opposite to the polarity of the data voltage applied to the third data line D3. Similarly, the polarity of the data voltage applied to the second data line D2 is opposite to the polarity of the data voltage applied to the fourth data line D4.

As shown in FIG. 3, the polarities of the data voltages applied to the first, second, third, and fourth data lines D1, D2, D3, and D4 are +, −, −, and +, respectively, but they should not be limited to such an embodiment. Instead, the polarities of the data voltages applied to the first, second, third, and fourth data lines D1, D2, D3, and D4 may be −, +, +, and −, respectively.

The adjacent sub-pixels in the first direction DR1 may be connected to the same gate line. For instance, the sub-pixels arranged in a first sub-pixel row are connected to the first gate line G1. Accordingly, the sub-pixels arranged in the first sub-pixel row are operated in response to the gate signal applied to the first gate line G1. Thus, the sub-pixels arranged in the first sub-pixel row are operated during one horizontal period (1H).

The sub-pixels arranged in each sub-pixel row are connected to a left data line or a right data line, which are disposed adjacent to the sub-pixel. For instance, the sub-pixels arranged in the first sub-pixel row are connected to the left data line and the sub-pixels arranged in a second sub-pixel row are connected to the right data line.

The sub-pixels arranged in the same sub-pixel column between two data lines adjacent to each other among the data lines D1 to D13 are alternately connected to the two data lines in the unit of at least one sub-pixel. In other words, the sub-pixels arranged in one sub-pixel column are alternately connected to the left and right data lines in the unit of one row. As shown in FIG. 3, the sub-pixels disposed between the first and second data lines D1 and D2 and arranged in a column in the second direction DR2 are alternately connected to the first and second data lines D1 and D2 in the unit of one sub-pixel. Among the sub-pixels disposed between the first and second data lines D1 and D2, the sub-pixels connected to the first and third gate lines G1 and G3 are connected to the first data line D1 and the sub-pixels connected to the second and fourth gate lines G2 and G4 are connected to the second data line D2.

Figure 4:
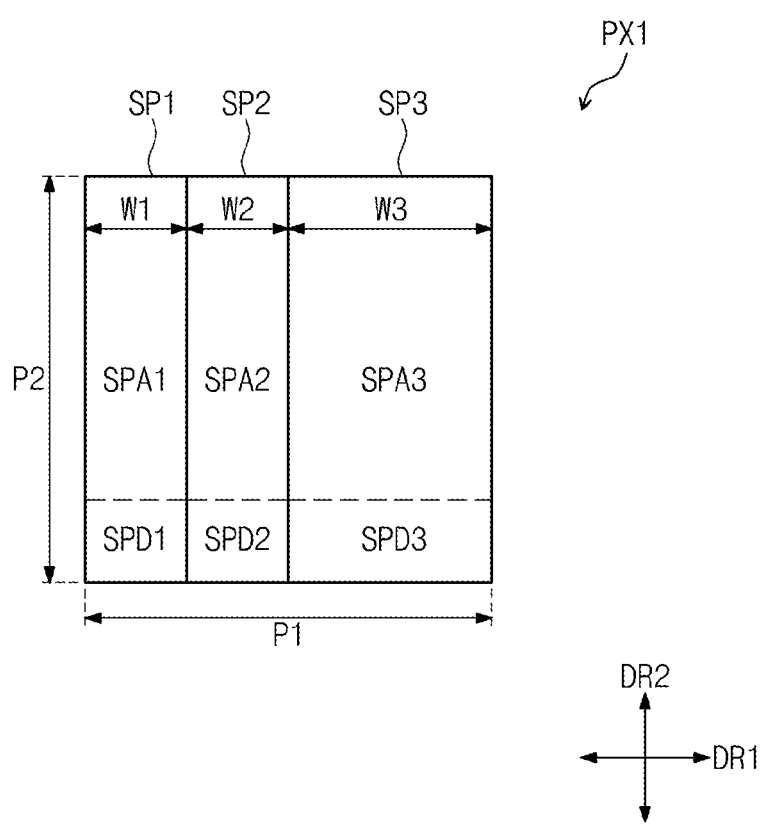
FIG. 4 is a plan view showing a first pixel according to an exemplary embodiment.

FIG. 4 is a plan view showing the first pixel PX1 according to an exemplary embodiment.

Referring to FIGS. 3 and 4, each of the first and second pixels PX1 and PX2 may have a substantially square shape. In the present exemplary embodiment, the first and second pixels PX1 and PX2 have the same shape, hereinafter, the first pixel PX1 will be described in detail.

A width P1 in the first direction DR1 of the first pixel PX1 is substantially the same as a width P2 in the second direction DR2 of the first pixel PX1. That is, a ratio (hereinafter, "an aspect ratio") of the width P1 in the first direction DR1 of the first pixel PX1 to the width P2 in the second direction DR2 of the first pixel PX1 is 1:1. Similarly, the aspect ratio of the second pixel PX2 is 1:1.

The first sub-pixel SP1 has a first width W1 in the first direction DR1 and the second sub-pixel SP2 has a second width W2 in the first direction DR1. The first width W1 is substantially the same as the second width W2. The third sub-pixel SP3 has a third width W3 greater than the first width W1 in the first direction DR1. The third width W3 is two times greater than the first width W1.

The width in the first direction DR1 of each of the first, second, and third sub-pixels SP1, SP2, and SP3 corresponds to a distance between center portions of two data lines disposed at both sides of a corresponding sub-pixel of the first, second, and third sub-pixels SP1. SP2, and SP3. For instance, the first width W1 in the first direction DR1 of the first sub-pixel SP1 corresponds to the distance between the center portion of the first data line D1 in the first direction DR1 and the center portion of the second data line D2 in the first direction DR1.

The first sub-pixel SP1 includes a first pixel area SPA1 and a first driving area SPD1, the second sub-pixel SP2 includes a second pixel area SPA2 and a second driving area SPD2, and the third sub-pixel SP3 includes a third pixel area SPA3 and a third driving area SPD3. The first, second, and third driving areas SPD1, SPD2, and SPD3 respectively include the thin film transistors, which are used to drive the first, second, and third sub-pixels SP1, SP2, and SP3, respectively. The first, second, and third pixel areas SPA1, SPA2, and SPA3 include the pixel electrodes respectively connected to the thin film transistors to display the image.

In FIG. 4, each of the first, second, and third pixel areas SPA1, SPA2, and SPA3 have the same width as that of a corresponding driving area of the first, second, and third driving areas SPD1, SPD2, and SPD3 in the first direction DR1.

Similar to the first, second, and third sub-pixels SP1, SP2, and SP3, the fourth sub-pixel SP4 has the first width W1 in the first direction DR1 and the fifth sub-pixel SP5 has the second width W2 in the first direction DR1 (not shown). The first width W1 of the fourth sub-pixel SP4 is substantially the same as the second width W2 of the fifth sub-pixel SP5 (not shown). The sixth sub-pixel SP6 has the third width W3 greater than the first width W1 of the fourth sub-pixel SP4 in the first direction DR1 (not shown). The third width W3 is two times greater than the first width W1 of the fourth sub-pixel SP4 (not shown).

Figure 5:
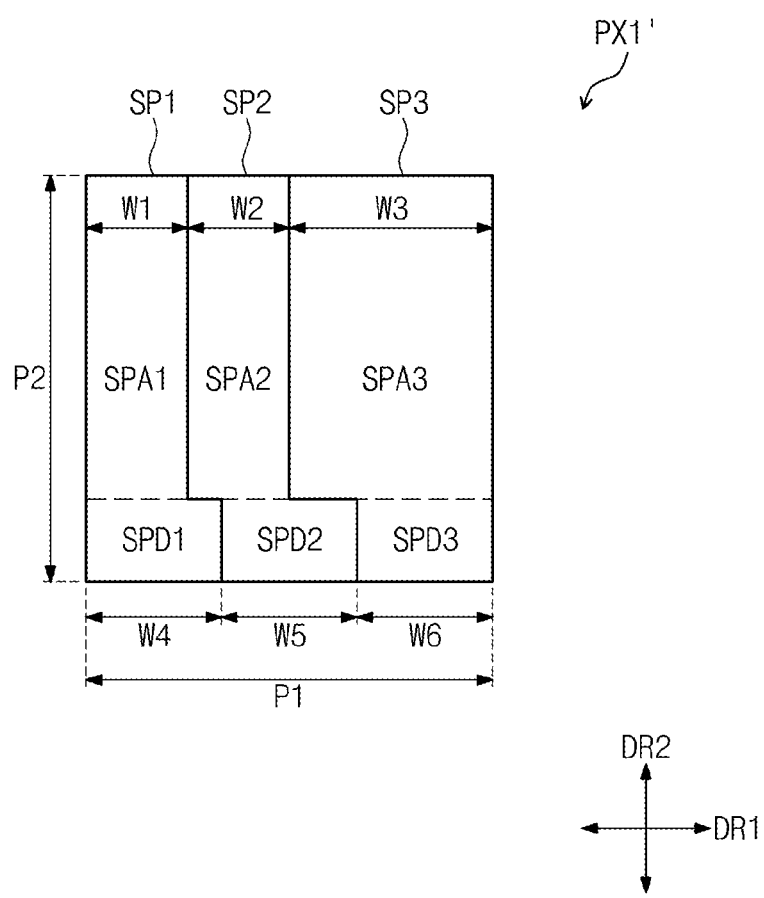
FIG. 5 is a plan view showing a first pixel according to another exemplary embodiment.

FIG. 5 is a plan view showing a first pixel PX1' according to another exemplary embodiment.

Referring to FIG. 5, pixel areas and driving areas of the first pixel PX1' have different widths from those of the first pixel PX1 shown in FIG. 4.

Each of first, second, and third pixel areas SPA1, SPA2, and SPA3 shown in FIG. 5 have the same width as that of a corresponding sub-pixel area of the first, second, and third sub-pixel areas SPA1 to SPA3 shown in FIG. 4 in the first direction DR1. Specifically, the first pixel area SPA1 has the first width W1 in the first direction DR1, the second pixel area SPA2 has the second width W2 in the first direction DR1, and the third pixel area SPA3 has the third width W3 in the first direction DR1.

In FIG. 5, the first driving area SPD1 has a fourth width W4 different from the first width W1 in the first direction DR1, the second driving area SPD2 has a fifth width W5 different from the second width W2 in the first direction DR1, and the third driving area SPD3 has a sixth width W6 different from the third width W3 in the first direction DR1.

The fourth, fifth, and sixth widths W4, W5, and W6 are the same. Each of the fourth, fifth, and sixth widths W4, W5, and W6 are greater than the first and second widths W1 and W2 and smaller than the third width W3.

The widths in the first direction DR1 of the first, second, and third pixel areas SPA1, SPA2, and SPA3 should not be limited to a specific value, but the transistors respectively disposed in the first, second, and third driving areas SPD1, SPD2, and SPD3 are the same. Therefore, the first, second, and third driving areas SPD1, SPD2, and SPD3 shown in FIG. 5 have the same width in the first direction DR1, and thus spaces, in which the thin film transistors are respectively disposed, may be secured.

Although not shown in FIGS. 4 and 5, one sub-pixel of the first, second, and third sub-pixels SP1, SP2, and SP3 may have a width different from that of another sub-pixel in the second direction DR2.

Figure 6:
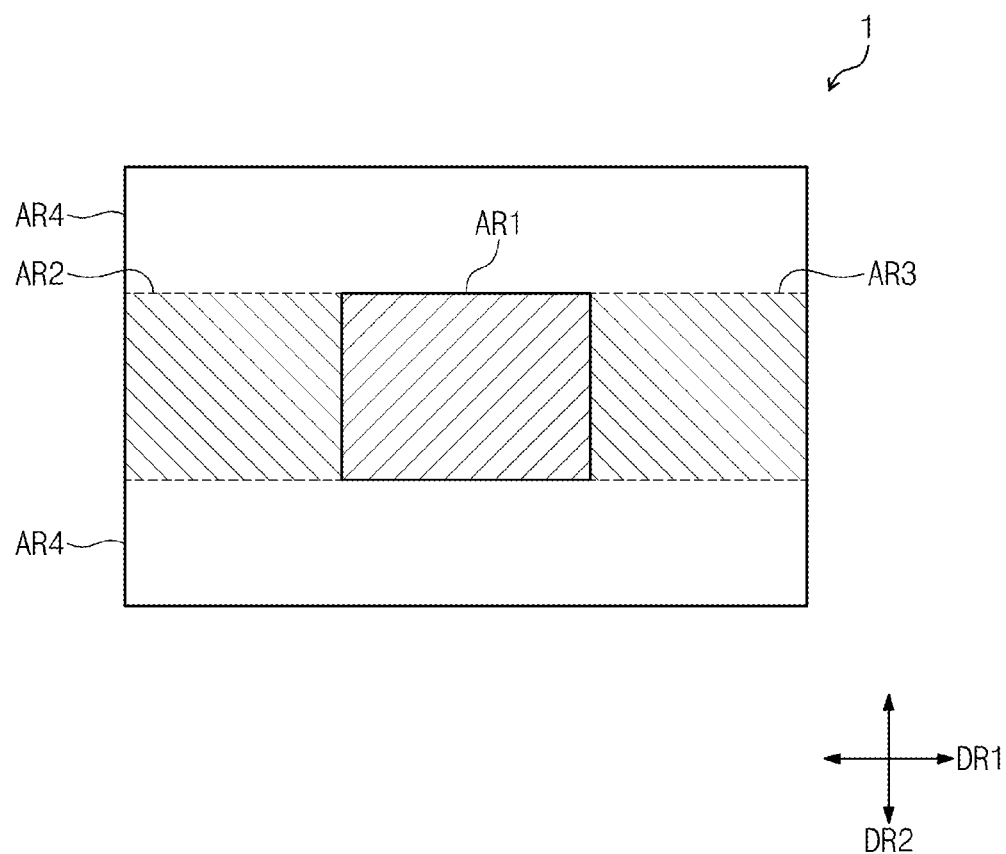
FIG. 6 is a view showing a liquid crystal display panel in which a horizontal crosstalk occurs.

FIG. 6 is a view showing a liquid crystal display panel 1 in which a horizontal crosstalk occurs.

The liquid crystal display panel 1 shown in FIG. 6 displays a primary color (e.g., a red color) in a first area AR1.

Referring to FIGS. 2 and 6, the common electrode CE is disposed to overlap with the pixel electrodes respectively disposed in the sub-pixels and the data voltages applied to the pixel electrodes exert influence on the level of the common voltage applied to the common electrode CE. When a sum of polarities of the data voltages applied to the pixels displaying the primary colors during 1H period is relatively biased to the positive or negative polarity, a ripple occurs in the common voltage in a positive or negative way due to a coupling phenomenon between the common electrode and the data lines, and the common voltage is not uniformly maintained. In this case, the horizontal crosstalk, in which a difference in brightness between a peripheral area AR4 and the second and third areas AR2 and AR3, occurs in second and third areas AR2 and AR3 disposed adjacent to the first area AR1 in the first direction DR1.

Referring to FIG. 3 again, among the sub-pixels connected to one gate line and displaying the first color, the number of the sub-pixels applied with the positive data voltage is equal to the number of the sub-pixels applied with the negative data voltage.

The red sub-pixels arranged in the first sub-pixel row connected to the first gate line G1 will be described as a representative example. The red sub-pixels of the first sub-pixel row are configured to include four red sub-pixels respectively connected to the first, fourth, seventh, and tenth data lines D1, D4, D7, and D10. The red sub-pixels (R+) connected to the first and fourth data lines D1 and D4 receive the positive data voltage, and the red sub-pixels (R−) connected to the seventh and tenth data lines D7 and D10 receive the negative data voltage.

In FIG. 3, the number of each of the green, blue, and white sub-pixels that are applied with the positive data voltage, is equal to the number of each of the green, blue, and white sub-pixels that are applied with the negative data voltage.

According to the present exemplary embodiment, the polarities of the data voltages applied to the sub-pixels are offset with respect to each other during the 1H period in which the sub-pixels connected to the first gate line G1 are operated, and thus the ripple does not occur in the common voltage. Consequently, the horizontal crosstalk phenomenon may be improved.

Figure 7:
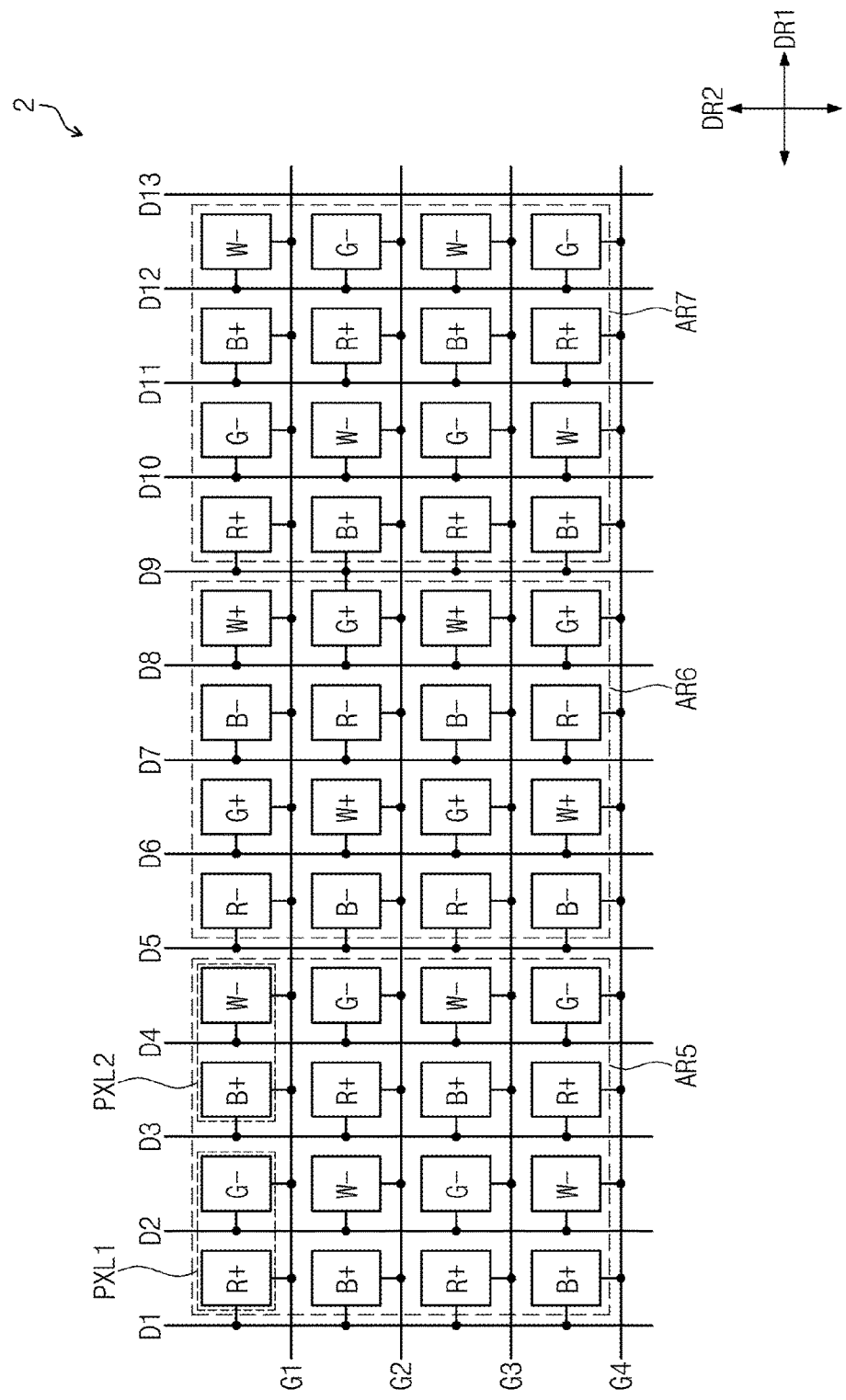
FIG. 7 is a plan view showing a portion of a liquid crystal display panel according to a comparative example.

FIG. 7 is a plan view showing a portion of a liquid crystal display panel 2 according to a comparison example. Hereinafter, a moving line-stain phenomenon will be described in detail with reference to FIG. 7.

Referring to FIG. 7, each pixel PXL1 and PXL2 of the liquid crystal display panel 2 includes two sub-pixels. Each pixel PXL1 and PXL2 includes red and green sub-pixels or blue and white sub-pixels. The polarities of the data voltages applied to the sub-pixels of the liquid crystal display panel 2 are inverted every frame period.

In FIG. 7, the red sub-pixels of the liquid crystal display panel 2 are operated in response to the positive or negative data voltage. Referring to FIG. 7, the liquid crystal display panel 2 displays the red image in fifth and sixth areas AR5 and AR6 during an i-th frame period and displays the red image in sixth and seventh areas AR6 and AR7 during an (i+1)th frame period. In this case, a difference in brightness between the red sub-pixels applied with the positive data voltage and the red sub-pixels applied with the negative data voltage occurs. Accordingly, the positive data voltage is accumulated when the i-th frame period is changed to the (i+1)th frame period, and thus the image displayed in the fifth area AR5 during the i-th frame period may be perceived as the image displayed in the fifth area AR5 during the i-th frame period moves to the image of the sixth area AR6 after one frame period. In addition, the negative data voltage is accumulated when the i-th frame period is changed to the (i+1)th frame period, and thus the image displayed in the sixth area AR6 during the i-th frame period may be perceived as the image displayed in the sixth area AR6 during the i-th frame period moves to the image of the seventh area AR7 after one frame period. As described above, a phenomenon in which a vertical line seems to move is called the moving line-stain. The moving line-stain may occur not only when some pixels are operated to display a specific color, but also when all pixels are operated to display the white color.

Referring to FIG. 3 again, among the sub-pixels connected to one gate line and displaying the first color, two sub-pixels disposed adjacent to each other in the first direction DR1 may receive the data voltages having the same polarity.

The red sub-pixels among the sub-pixels arranged in the first sub-pixel row and connected to the first gate line G1 will be described as a representative example. The red sub-pixels arranged in the first sub-pixel row receive the data voltages having the polarities of +, +, −, and −, respectively. The red sub-pixels alternately receive two positive data voltages and two negative data voltages. The red sub-pixels (R+) connected to the first data line D1 and the red sub-pixels (R+) connected to the fourth data line D4 receive the positive data voltages, and the red sub-pixels (R−) connected to the seventh data line D7 and the red sub-pixels (R−) connected to the tenth data line D10 receive the negative data voltages.

According to the present exemplary embodiment, two red sub-pixels adjacent to each other in the first direction DR1 may receive the data voltages having the same polarity during the 1H period in which the sub-pixels connected to the first gate line G1 are operated to display the red color. Accordingly, the moving line-stain phenomenon may be improved according to the present exemplary embodiment, compared to that when the red sub-pixels adjacent to each other in the first direction DR1 of the liquid crystal display panel 2 receive the data voltages having different polarities as shown in FIG. 2.

Table 1 represents a moving line-stain index according to the colors in each of the liquid crystal display panel 100 shown in FIG. 3 and the liquid crystal display panel 2 shown in FIG. 7.

TABLE 1

| | Color | White | Red | Green | Blue |
|---|---|---|---|---|---|
| Moving line-stain index | Comparison example | 29.2 | 27.8 | 34.7 | 23.4 |
| | Embodiment example shown in FIG. 3 | 14.3 | 23.1 | 30 | 23.4 |

The moving line-stain index is obtained by quantifying the degree in which the moving line-stain is perceived to human eyes in consideration of human visual property. As the moving line-stain index becomes higher, the degree in which the moving line-stain is perceived to human eyes becomes higher. As the moving line-stain index becomes lower, the degree in which the moving line-stain is perceived to human eyes becomes lower. The moving line-stain index is obtained when a user watches a liquid crystal display panel having a size of about 55 inches and a resolution of 1920×1080 at a distance of about 50 cm.

Referring to Table 1, the moving line-stain phenomenon in the white, red, and green colors of the liquid crystal display panel 100 shown in FIG. 3 may be better (i.e., lower) than the moving line-stain in the white, red, and green colors of the liquid crystal display panel 2 shown in FIG. 7.

Figure 8:
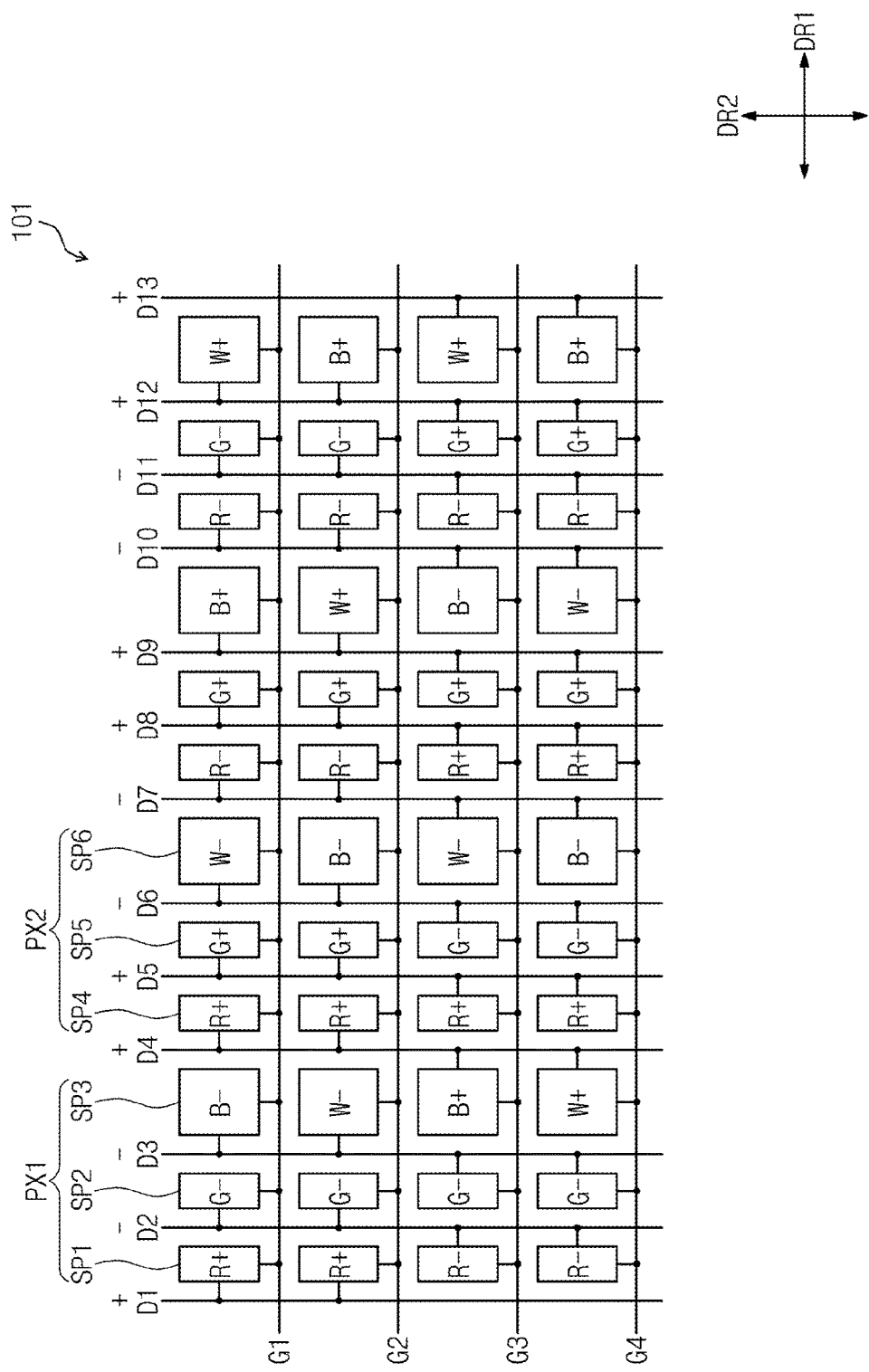
FIGS. 8, 9, 10, 11, 12, 13, 14, 15, 16, 17, 18, 19, 20, 21, 22, and 23 are plan views showing portions of liquid crystal display panels according to exemplary embodiments.
Figure 9:
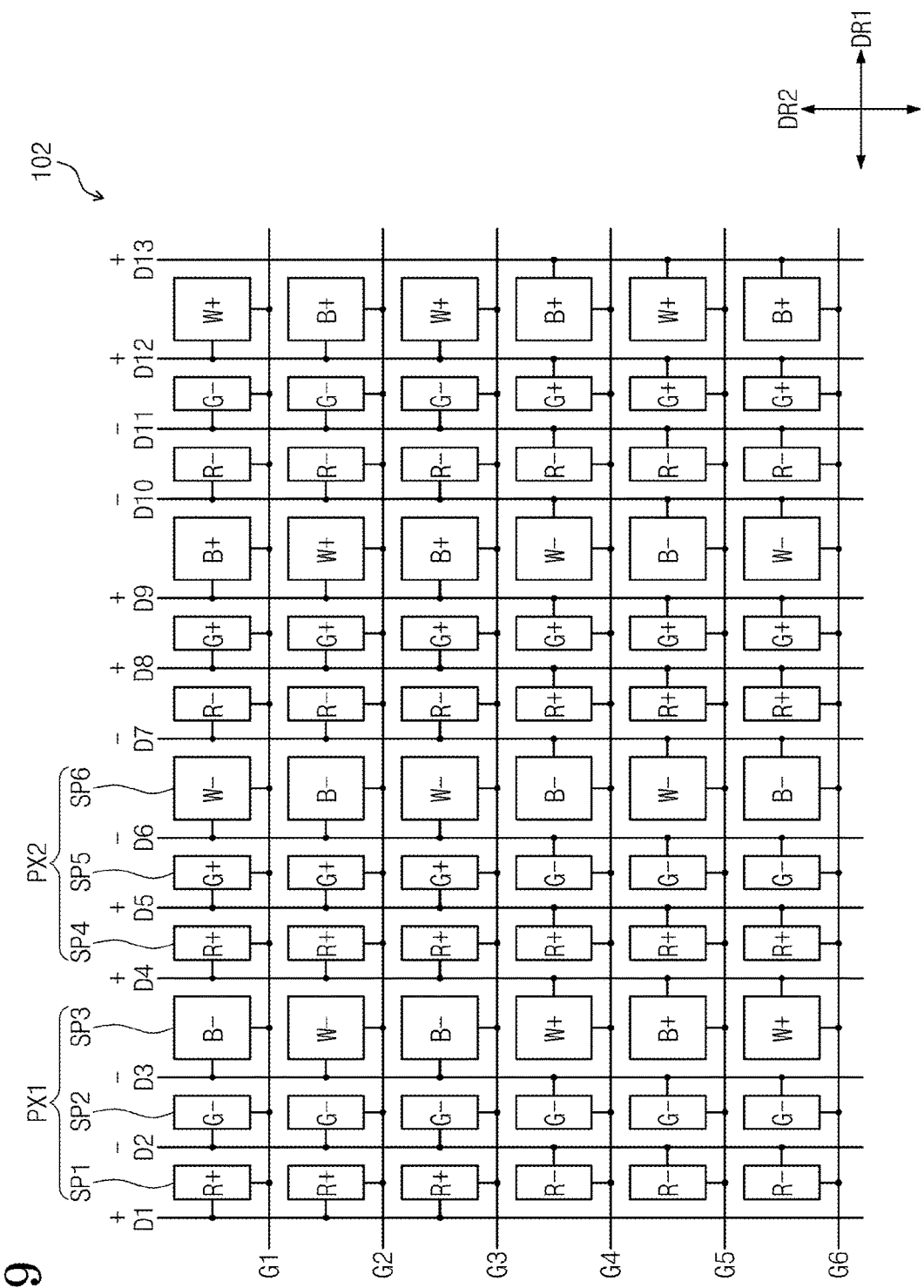
Figure 10:
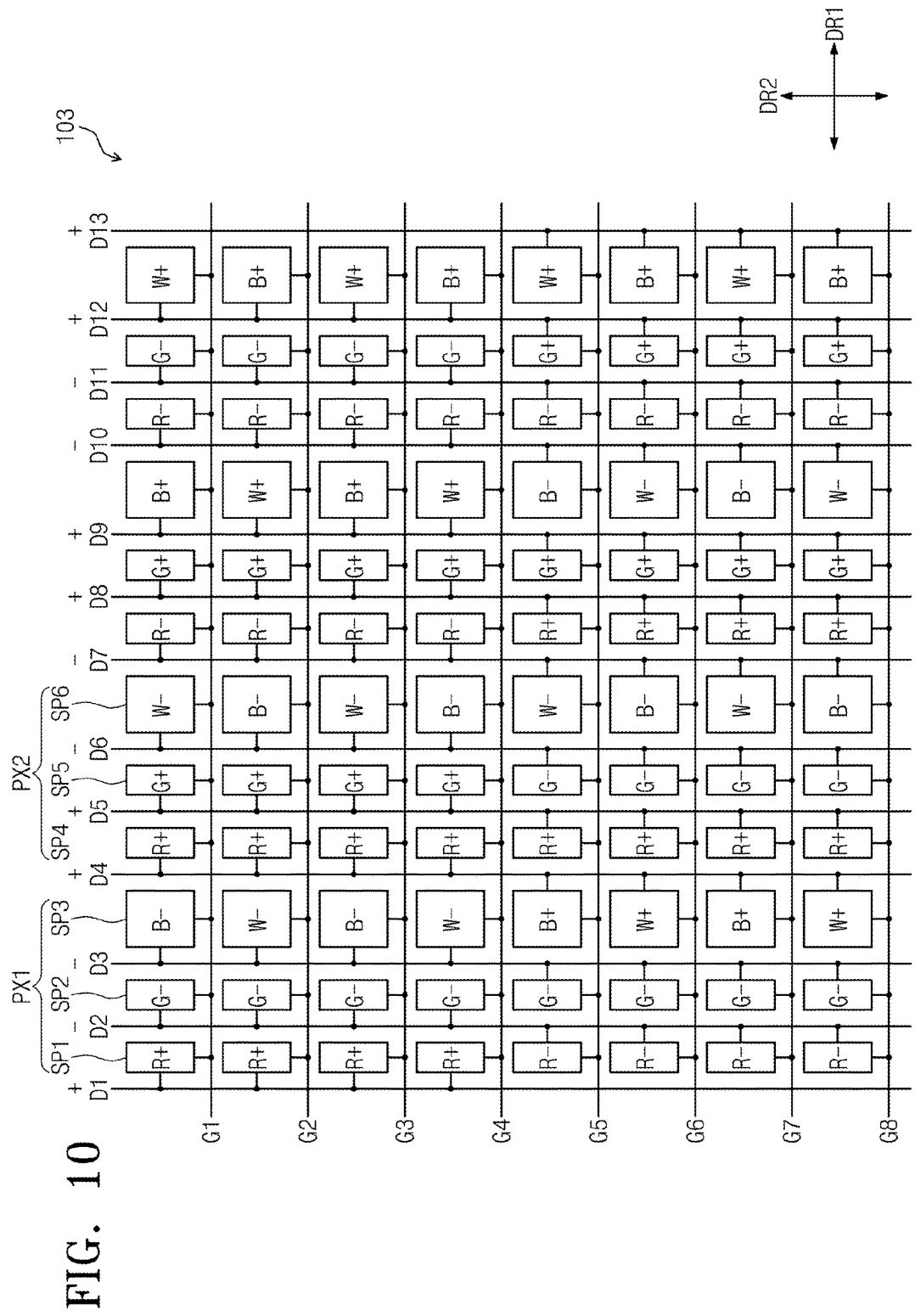

FIGS. 8, 9, and 10 are plan views showing a portion of liquid crystal display panels according to exemplary embodiments.

Hereinafter, different features of liquid crystal display panels 101, 102, and 103 respectively shown in FIGS. 8, 9, and 10 will be mainly described when compared to the liquid crystal display panel 100 shown in FIG. 3.

In the liquid crystal display panel 101 shown in FIG. 8, pixels arranged between two data lines adjacent to each other among the first to thirteenth data lines D1 to D13 are alternately connected to the two adjacent data lines every two pixels. In other words, the pixels arranged between the two data lines adjacent to each other are alternately connected to left and right adjacent data lines every two rows. For instance, among the pixels arranged between the two data lines adjacent to each other, the pixels connected to the first and second gate lines G1 and G2 are connected to the first data line D1 and the pixels connected to the third and fourth gate lines G3 and G4 are connected to the second data line D2.

In the liquid crystal display panel 102 shown in FIG. 9, pixels arranged between two data lines adjacent to each other among the first to thirteenth data lines D1 to D13 are alternately connected to the two adjacent data lines every three pixels. In other words, the pixels arranged between the two data lines adjacent to each other are alternately connected to left and right adjacent data lines every three rows. For instance, among the pixels arranged between the two data lines adjacent to each other, the pixels connected to the first, second, and third gate lines G1, G2, and G3 are connected to the first data line D1 and the pixels connected to the fourth, fifth, and sixth gate lines G4, G5, and G6 are connected to the second data line D2.

In the liquid crystal display panel 103 shown in FIG. 10, pixels arranged between two data lines adjacent to each other among the first to thirteenth data lines D1 to D13 are alternately connected to the two adjacent data lines every four pixels. In other words, the pixels arranged between the two data lines adjacent to each other are alternately connected to left and right adjacent data lines every four rows. For instance, among the pixels arranged between the two data lines adjacent to each other, the pixels connected to the first, second, third, and fourth gate lines G1, G2, G3, and G4 are connected to the first data line D1 and the pixels connected to the fifth, sixth, seventh, and eighth gate lines G5, G6, G7, and G8 are connected to the second data line D2.

FIGS. 11, 12, 13, and 14 are plan views showing a portion of liquid crystal display panels 104, 105, 106, and 107 according to exemplary embodiments.

The liquid crystal display panels 104, 105, 106, and 107 respectively shown in FIGS. 11, 12, 13, and 14 are similar to the liquid crystal display panels 100, 101, 102, and 103 respectively shown in FIGS. 3, 8, 9, and 10. Hereinafter, different features of the liquid crystal display panels 104, 105, 106, and 107 will be mainly described when compared to the liquid crystal display panels 100, 101, 102, and 103 respectively shown in FIGS. 3, 8, 9, and 10.

The liquid crystal display panels 104, 105, 106, and 107 respectively shown in FIGS. 11, 12, 13, and 14 apply the data voltages to the first to thirteenth data lines D1 to D13, which have different polarities from those of the data voltages of the liquid crystal display panel 100 shown in FIG. 3. In the liquid crystal display panels 104, 105, 106, and 107 respectively shown in FIGS. 11, 12, 13, and 14, the polarities of the data voltages applied to the first to thirteenth data lines D1 to D13 are repeated every four data lines, which are consecutive, e.g., D1, D2, D3, and D4. Hereinafter, the first, second, third, and fourth data lines D1, D2, D3, and D4 will be described in detail as a representative example. Among the first, second, third, and fourth data lines D1, D2, D3, and D4, the polarities of the data voltages applied to two earlier data lines D1 and D2 are opposite to those of the data voltages applied to two later data lines D3 and D4. For instance, the polarity of the data voltage applied to the first data line D1 is opposite to the polarity of the data voltage applied to the third data line D3 and the polarity of the data voltage applied to the second data line D2 is opposite to the polarity of the data voltage applied to the fourth data line D4.

In FIGS. 11, 12, 13, and 14, the polarities of the data voltages applied to the first, second, third, and fourth data lines D1, D2, D3, and D4 are +, +, −, and −, respectively, but they should not be limited to such an embodiment. Instead, the polarities of the data voltages applied to the first, second, third, and fourth data lines D1, D2, D3, and D4 may be −, −, +, and +, respectively.

Figure 11:
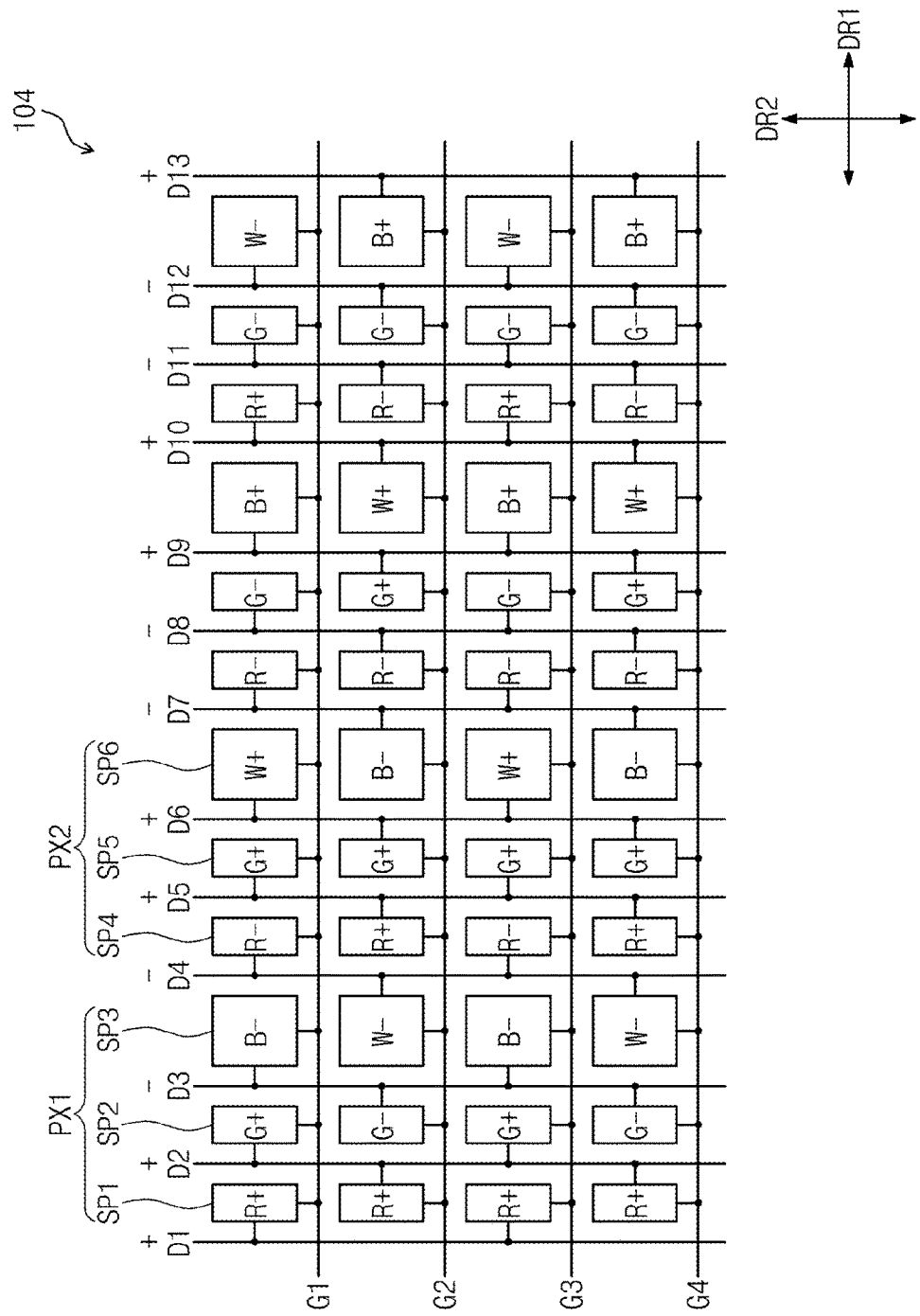
Figure 12:
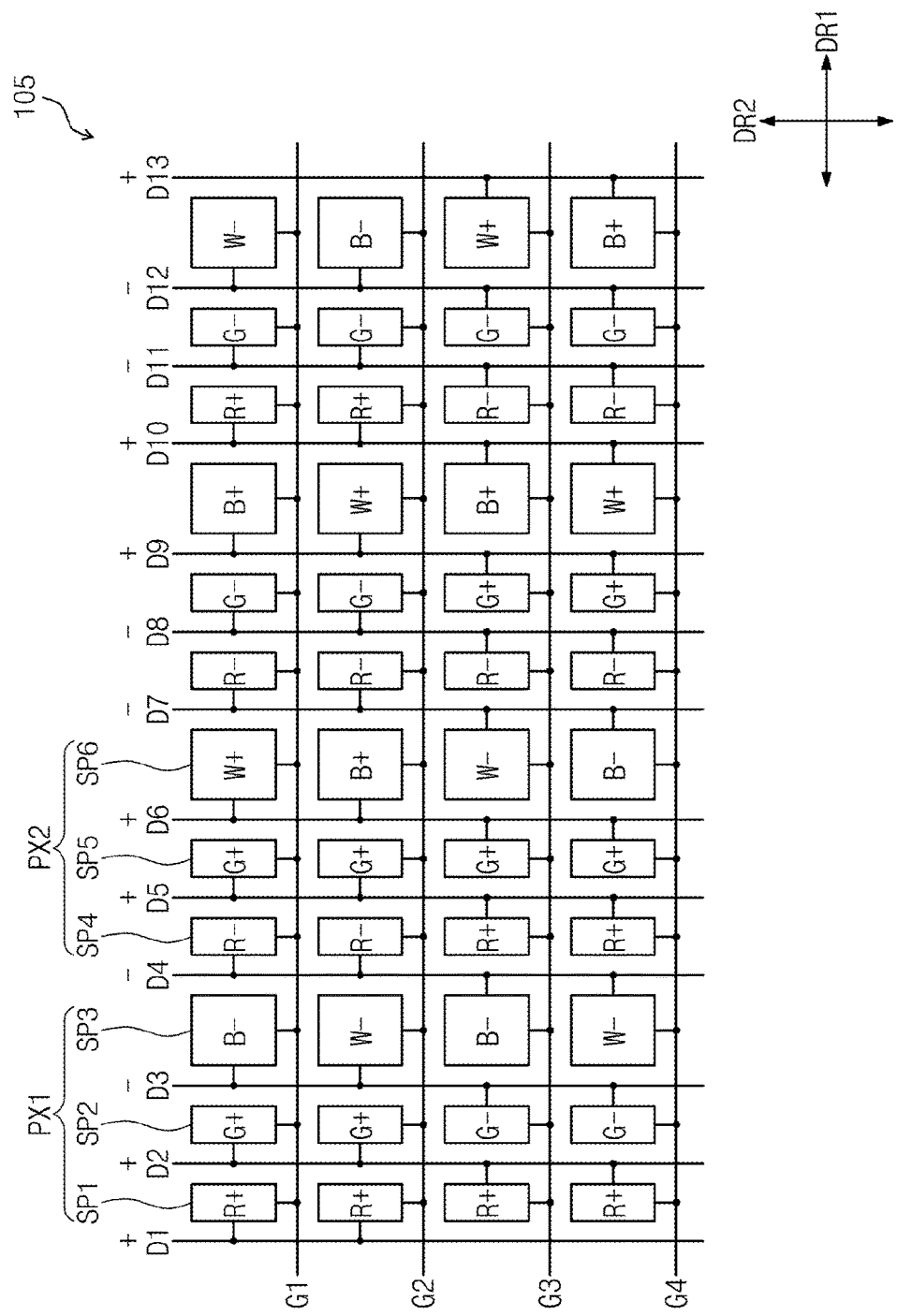
Figure 13:
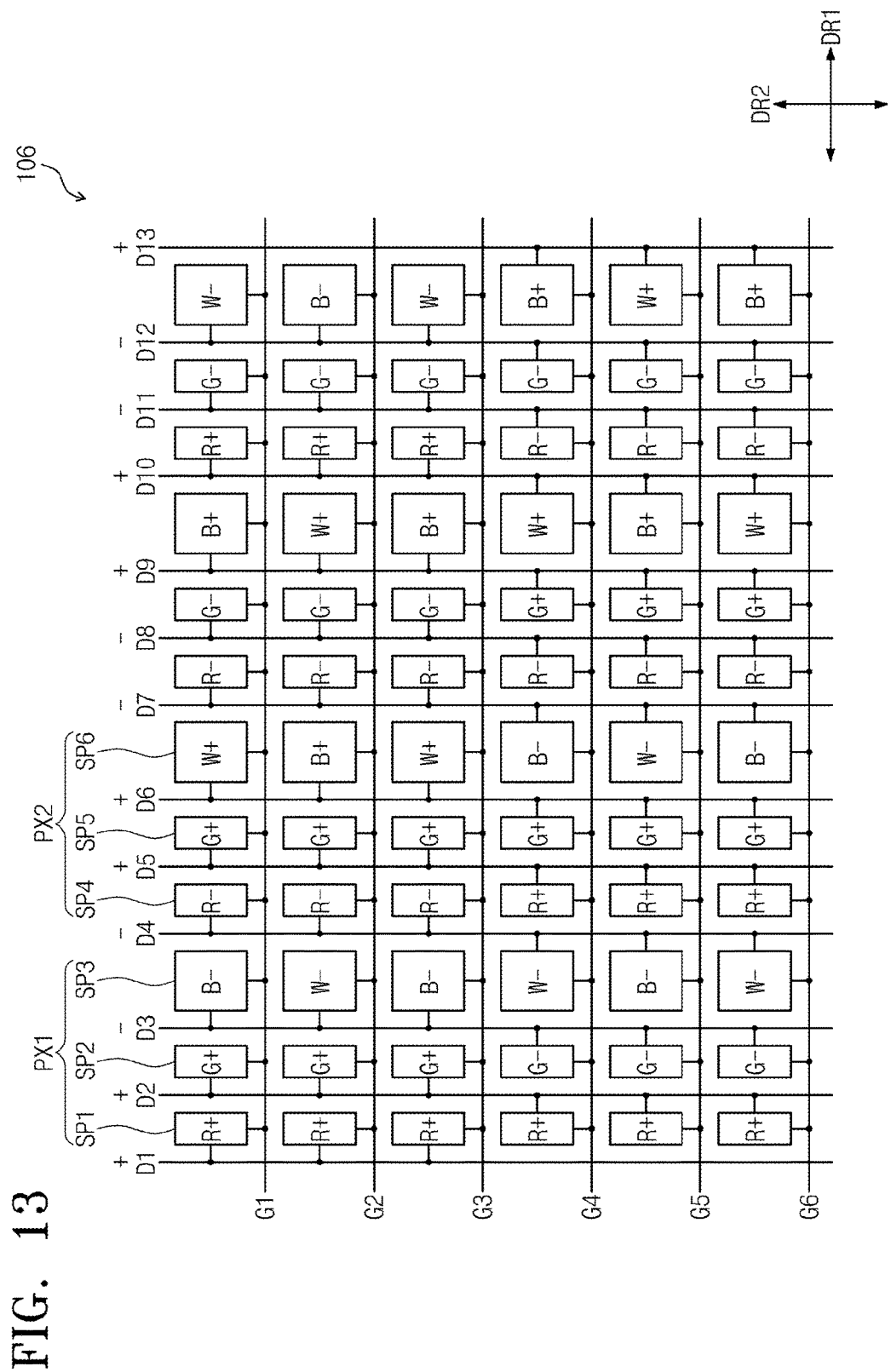
Figure 14:
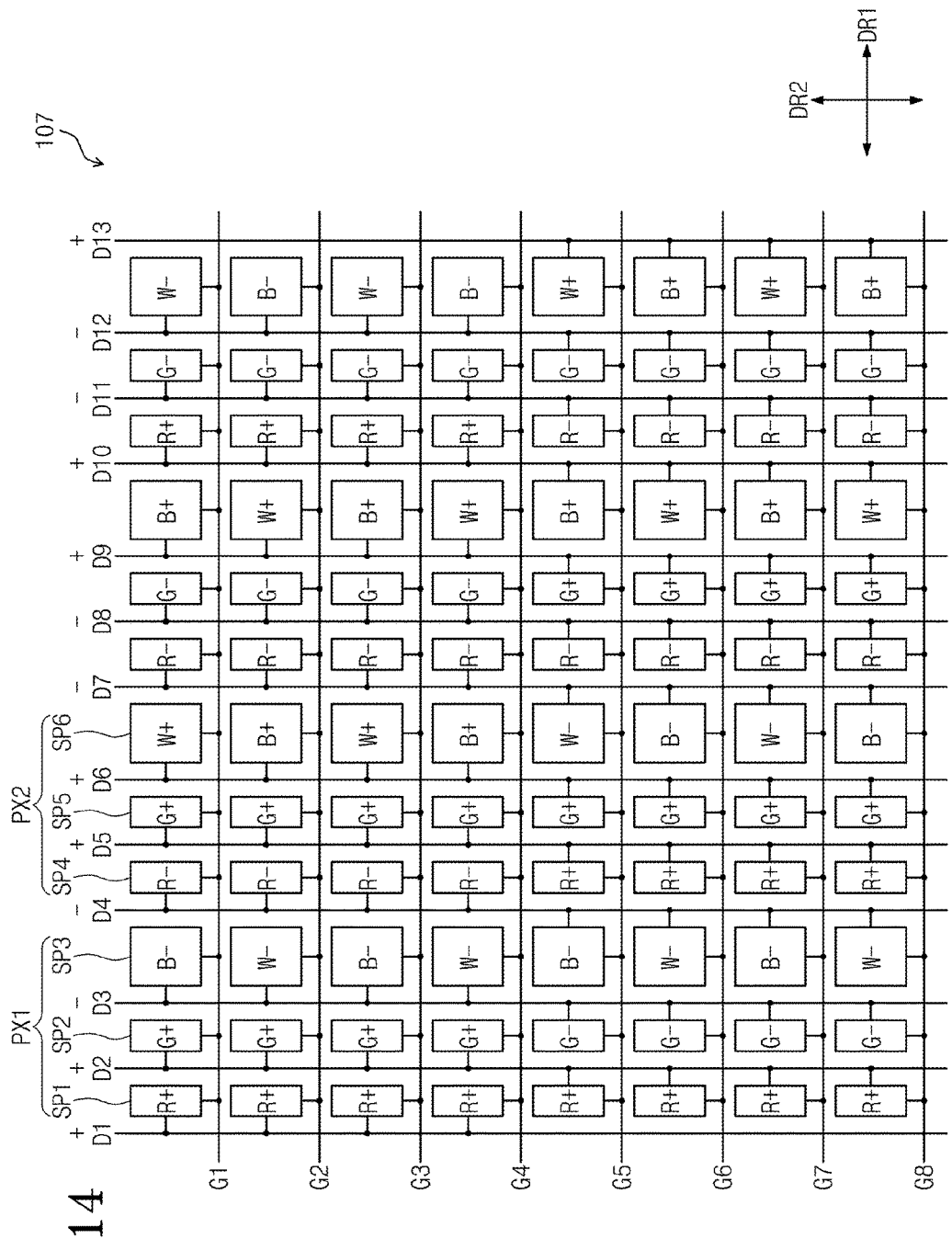

The liquid crystal display panel 104 shown in FIG. 11 has substantially the same structure and function as those of the liquid crystal display panel 100 shown in FIG. 3 except for the polarities of the data voltages applied to the first to thirteenth data lines D1 to D13. The liquid crystal display panel 105 shown in FIG. 12 has substantially the same structure and function as those of the liquid crystal display panel 101 shown in FIG. 8 except for the polarities of the data voltages applied to the first to thirteenth data lines D1 to D13. The liquid crystal display panel 106 shown in FIG. 13 has substantially the same structure and function as those of the liquid crystal display panel 102 shown in FIG. 9 except for the polarities of the data voltages applied to the first to thirteenth data lines D1 to D13. The liquid crystal display panel 107 shown in FIG. 14 has substantially the same structure and function as those of the liquid crystal display panel 103 shown in FIG. 10 except for the polarities of the data voltages applied to the first to thirteenth data lines D1 to D13.

FIGS. 15, 16, 17, and 18 are plan views showing a portion of liquid crystal display panels 108, 109, 110, and 111 according to exemplary.

The liquid crystal display panels 108, 109, 110, and 111 respectively shown in FIGS. 15, 16, 17, and 18 are similar to the liquid crystal display panels 100, 101, 102, and 103 respectively shown in FIGS. 3, 8, 9, and 10. Hereinafter, different features of the liquid crystal display panels 108, 109, 110, and 111 will be mainly described when compared to the liquid crystal display panels 100, 101, 102, and 103 respectively shown in FIGS. 3, 8, 9, and 10.

The liquid crystal display panels 108, 109, 110, and 111 respectively shown in FIGS. 15, 16, 17, and 18 apply the data voltages to the first to thirteenth data lines D1 to D13, which have different polarities from those of the data voltages of the liquid crystal display panel 100 shown in FIG. 3. In the liquid crystal display panels 108, 109, 110, and 111 respectively shown in FIGS. 15, 16, 17, and 18, the polarities of the data voltages applied to the first to thirteenth data lines D1 to D13 are repeated every consecutive twelve data lines, e.g., D1 to D12. Hereinafter, the first to twelfth data lines D1 to D12 will be described in detail as a representative example. Among the first to twelfth data lines D1 to D12, the polarities of the data voltages applied to six earlier data lines D1 to D6 are opposite to those of the data voltages applied to six later data lines D7 to D12. For instance, the polarity of the data voltage applied to the first data line D1 is opposite to the polarity of the data voltage applied to the seventh data line D7. The polarity of the data voltage applied to the second data line D2 is opposite to the polarity of the data voltage applied to the eighth data line D8. The polarity of the data voltage applied to the third data line D3 is opposite to the polarity of the data voltage applied to the ninth data line D9. The polarity of the data voltage applied to the fourth data line D4 is opposite to the polarity of the data voltage applied to the tenth data line D10. The polarity of the data voltage applied to the fifth data line D5 is opposite to the polarity of the data voltage applied to the eleventh data line D11. The polarity of the data voltage applied to the sixth data line D6 is opposite to the polarity of the data voltage applied to the twelfth data line D12.

In FIGS. 15, 16, 17, and 18, the polarities of the data voltages applied to the first to twelfth data lines D1 to D12 are +, +, −, +, −, +, −, −, +, −, +, and −, respectively, but they should not be limited to such an embodiment. Instead, the polarities of the data voltages applied to the first to twelfth data lines D1 to D12 may be −, −, +, −, +, −, +, +, −, +, −, and +, respectively.

Figure 15:
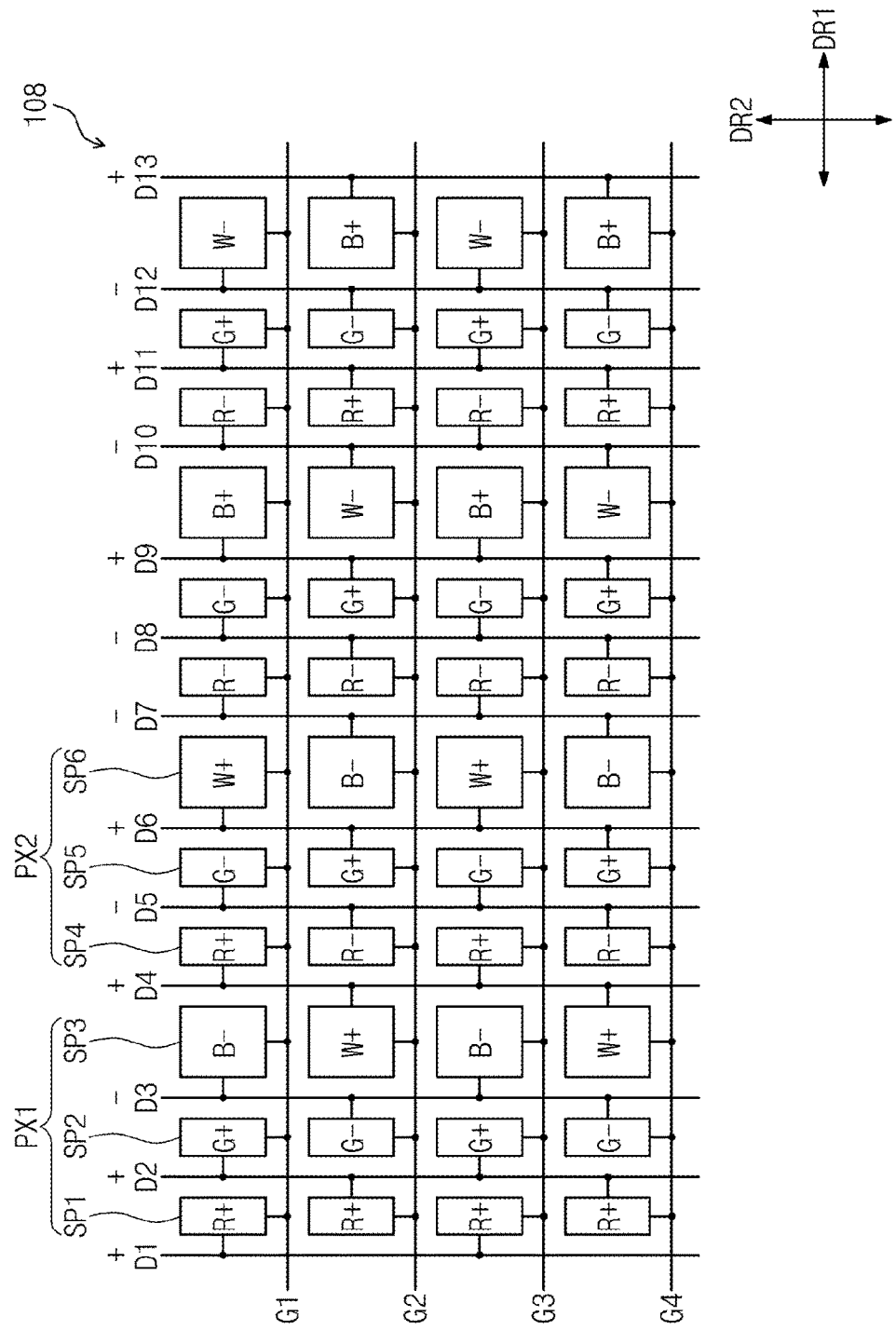
Figure 16:
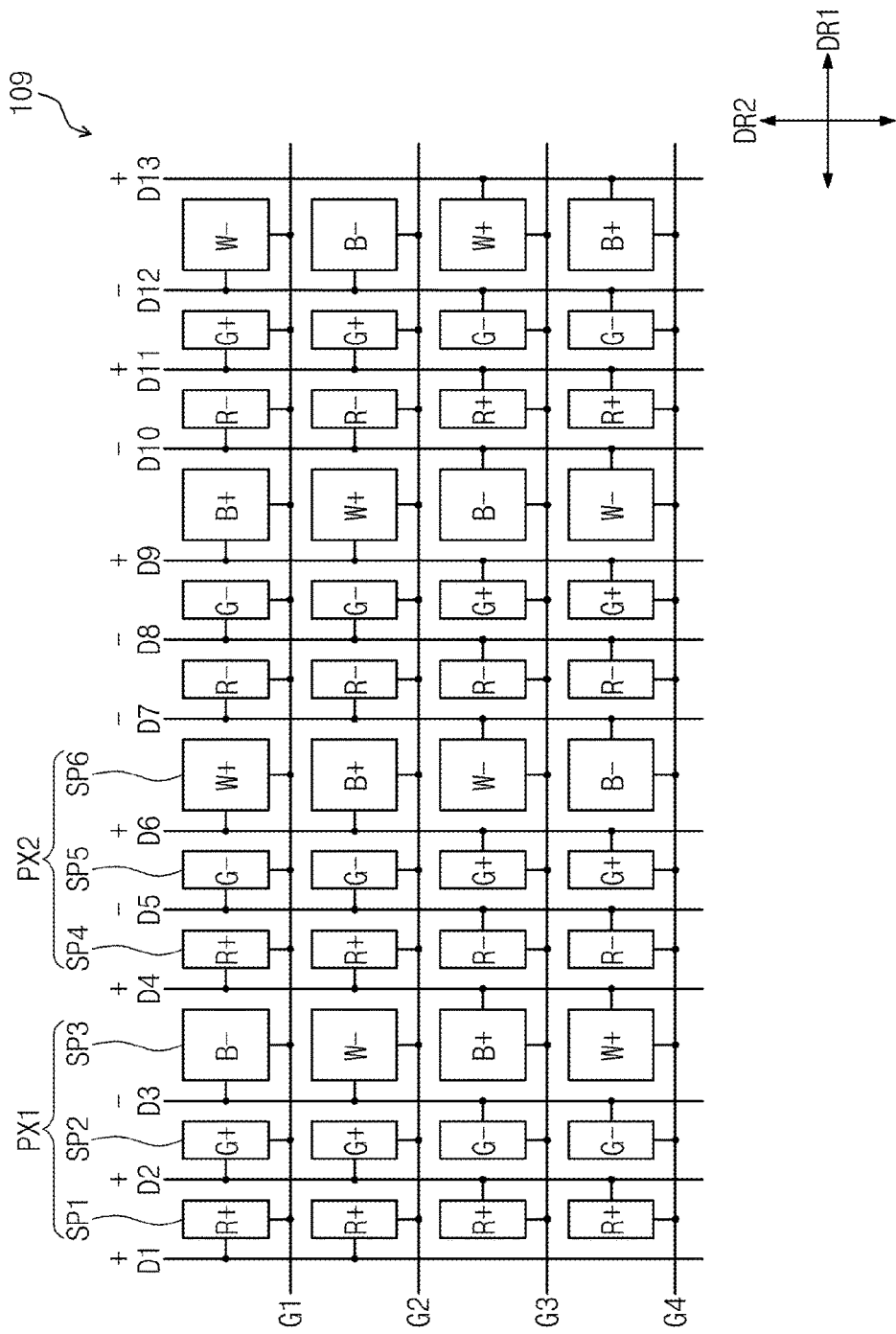
Figure 17:
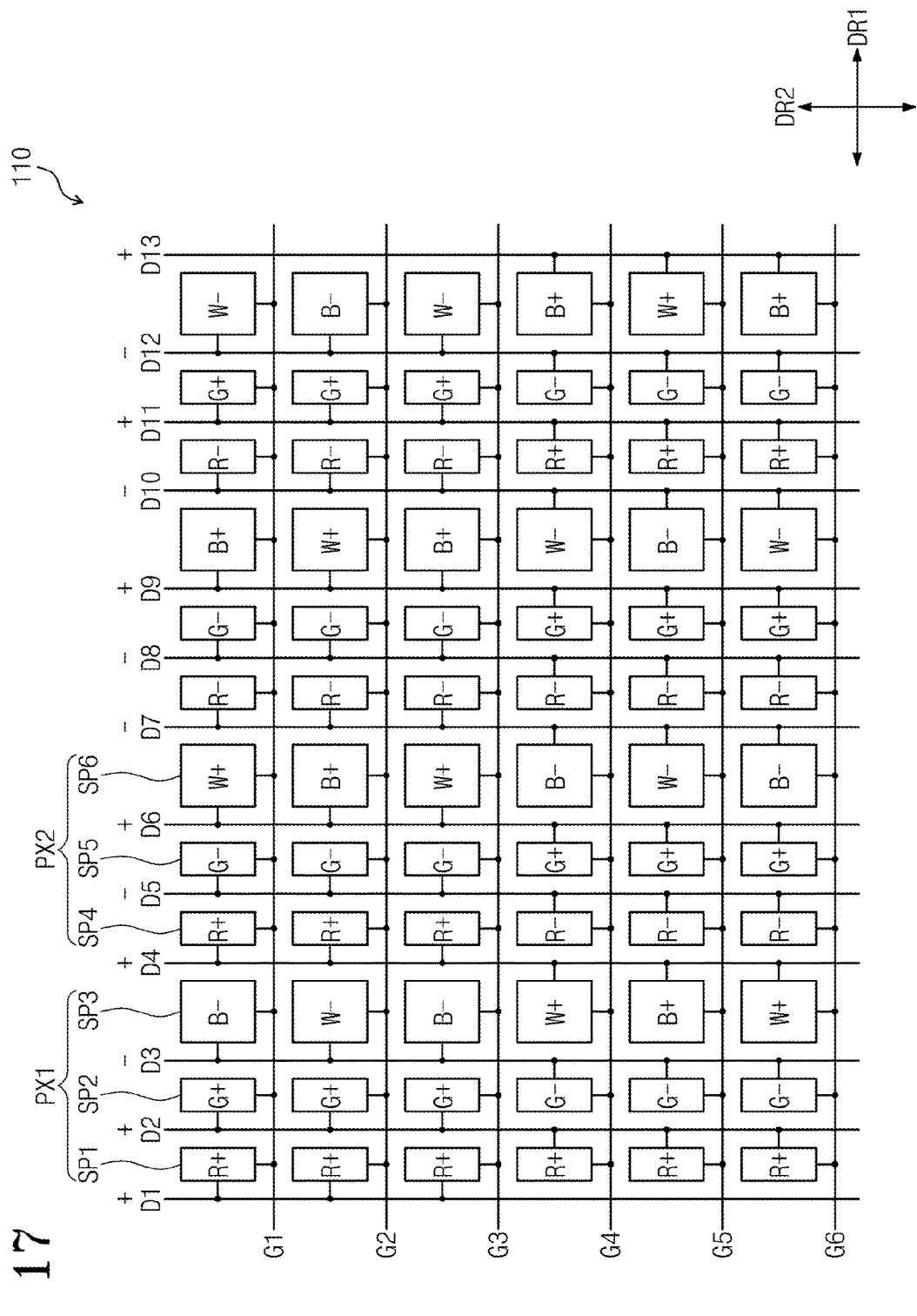
Figure 18:
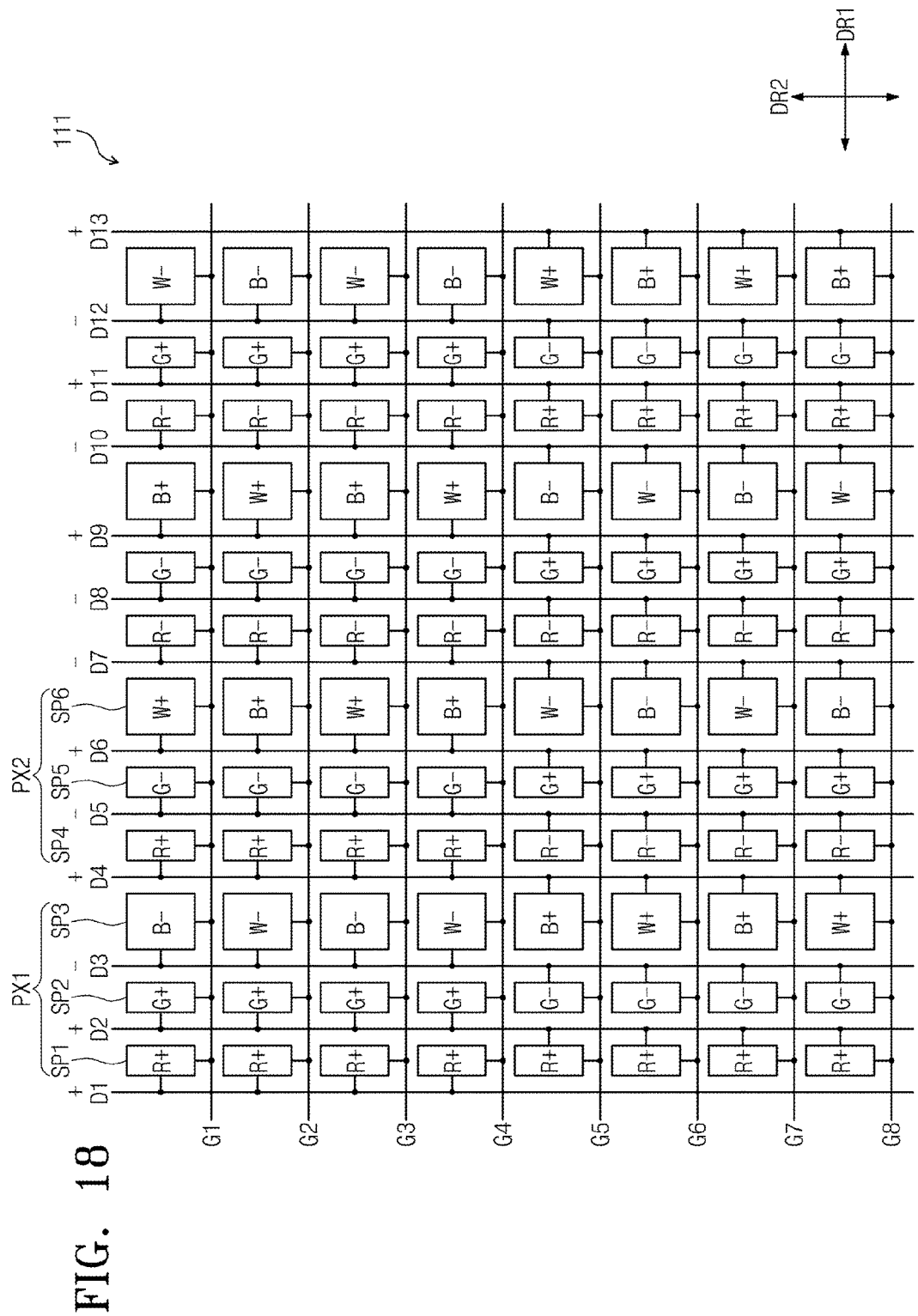

The liquid crystal display panel 108 shown in FIG. 15 has substantially the same structure and function as those of the liquid crystal display panel 100 shown in FIG. 3 except for the polarities of the data voltages applied to the first to thirteenth data lines D1 to D13. The liquid crystal display panel 109 shown in FIG. 16 has substantially the same structure and function as those of the liquid crystal display panel 101 shown in FIG. 8 except for the polarities of the data voltages applied to the first to thirteenth data lines D1 to D13. The liquid crystal display panel 110 shown in FIG. 17 has substantially the same structure and function as those of the liquid crystal display panel 102 shown in FIG. 9 except for the polarities of the data voltages applied to the first to thirteenth data lines D1 to D13. The liquid crystal display panel 111 shown in FIG. 18 has substantially the same structure and function as those of the liquid crystal display panel 103 shown in FIG. 10 except for the polarities of the data voltages applied to the first to thirteenth data lines D1 to D13.

Table 2 represents a moving line-stain index according to the colors in each of the liquid crystal display panel 108 shown in FIG. 15 and the liquid crystal display panel 2 shown in FIG. 7.

TABLE 2

| | Color | White | Red | Green | Blue |
|---|---|---|---|---|---|
| Moving line-stain index | Comparison example | 29.2 | 27.8 | 34.7 | 23.4 |
| | Embodiment example shown in FIG. 15 | 19.4 | 23.1 | 25.7 | 23.4 |

The moving line-stain index is obtained by quantifying the degree in which the moving line-stain is perceived to human eyes in consideration of human visual property. As the moving line-stain index becomes higher, the degree in which the moving line-stain is perceived to human eyes becomes higher, and as the moving line-stain index becomes lower, the degree in which the moving line-stain is perceived to human eyes becomes lower. The moving line-stain index is obtained when a user watches a liquid crystal display panel having a size of about 55 inches and a resolution of 1920×1080 at a distance of about 50 cm.

Referring to Table 2, the moving line-stain phenomenon in the white, red, and green colors of the liquid crystal display panel 108 shown in FIG. 15 may be better (i.e. lower) than moving ling stain phenomenon in the white, red, and green colors of the liquid crystal display panel 2 shown in FIG. 7.

FIGS. 19, 20, 21, and 22 are plan views showing a portion of liquid crystal display panels 112, 113, 114, and 115 according to exemplary embodiments. Hereinafter, different features of the liquid crystal display panels 112, 113, 114, and 115 will be mainly described when compared to the liquid crystal display panels 100, 101, 102, and 103 respectively shown in FIGS. 3, 8, 9, and 10.

The liquid crystal display panels 112, 113, 114, and 115 respectively shown in FIGS. 19, 20, 21, and 22 apply the data voltages to the first to thirteenth data lines D1 to D13, which have different polarities from those of the data voltages of the liquid crystal display panel 100 shown in FIG. 3. In the liquid crystal display panels 112, 113, 114, and 115 respectively shown in FIGS. 19, 20, 21, and 22, the polarities of the data voltages applied to the first to thirteenth data lines D1 to D13 are repeated every consecutive twelve data lines, e.g., D1 to D12. Hereinafter, the first to twelfth data lines D1 to D12 will be described in detail as a representative example. Among the first to twelfth data lines D1 to D12, the polarities of the data voltages applied to six earlier data lines D1 to D6 are opposite to those of the data voltages applied to six later data lines D7 to D12. For instance, the polarity of the data voltage applied to the first data line D1 is opposite to the polarity of the data voltage applied to the seventh data line D7. The polarity of the data voltage applied to the second data line D2 is opposite to the polarity of the data voltage applied to the eighth data line D8. The polarity of the data voltage applied to the third data line D3 is opposite to the polarity of the data voltage applied to the ninth data line D9. The polarity of the data voltage applied to the fourth data line D4 is opposite to the polarity of the data voltage applied to the tenth data line D10. The polarity of the data voltage applied to the fifth data line D5 is opposite to the polarity of the data voltage applied to the eleventh data line D11. The polarity of the data voltage applied to the sixth data line D6 is opposite to the polarity of the data voltage applied to the twelfth data line D12.

In FIGS. 19, 20, 21, and 22, the polarities of the data voltages applied to the first to twelfth data lines D1 to D12 are +, −, +, −, +, −, −, +, −, +, −, and +, respectively, but they should not be limited to such an embodiment. Instead, the polarities of the data voltages applied to the first to twelfth data lines D1 to D12 may be −, +, −, +, −, +, +, −, +, −, +, and −, respectively.

Figure 19:
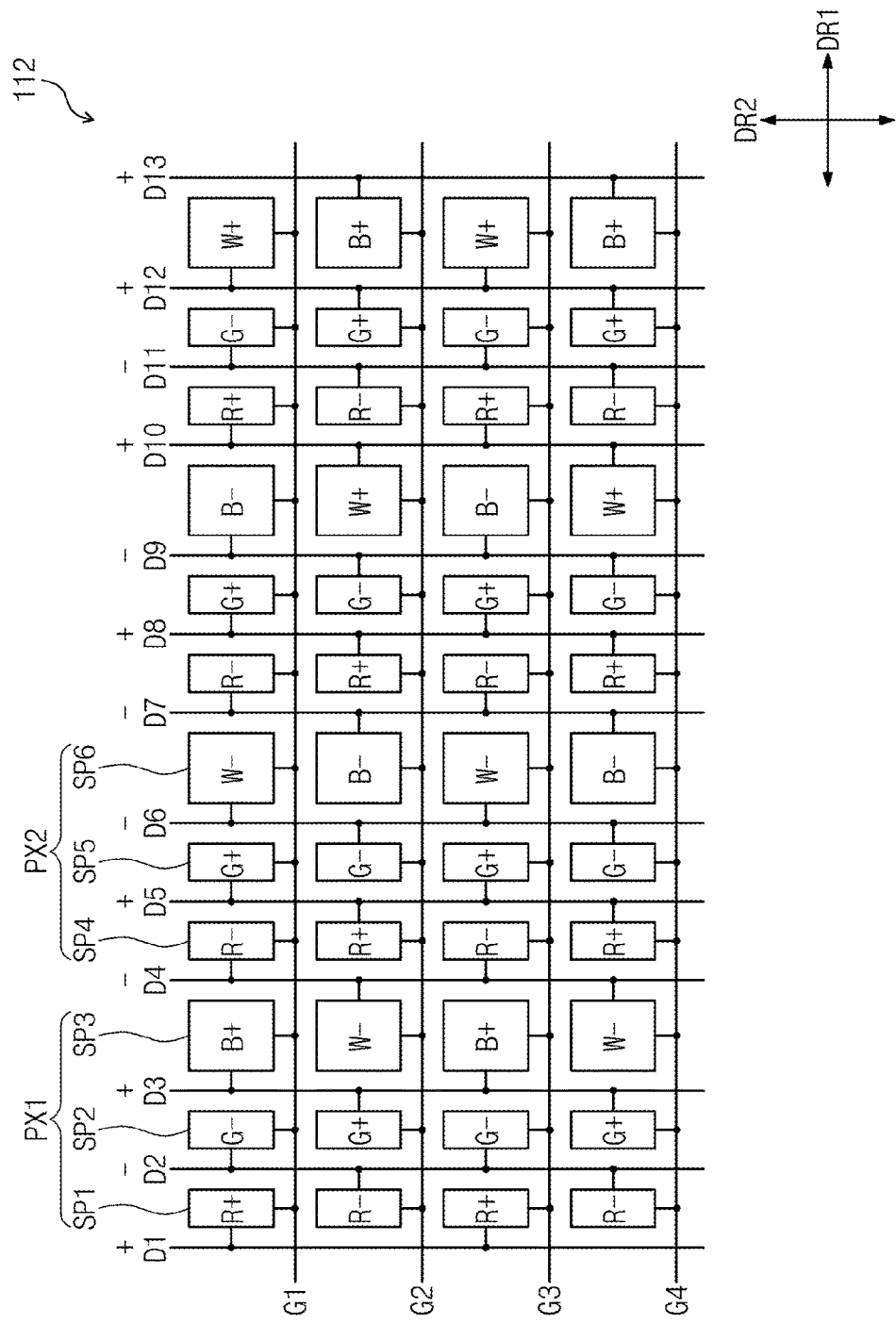
Figure 20:
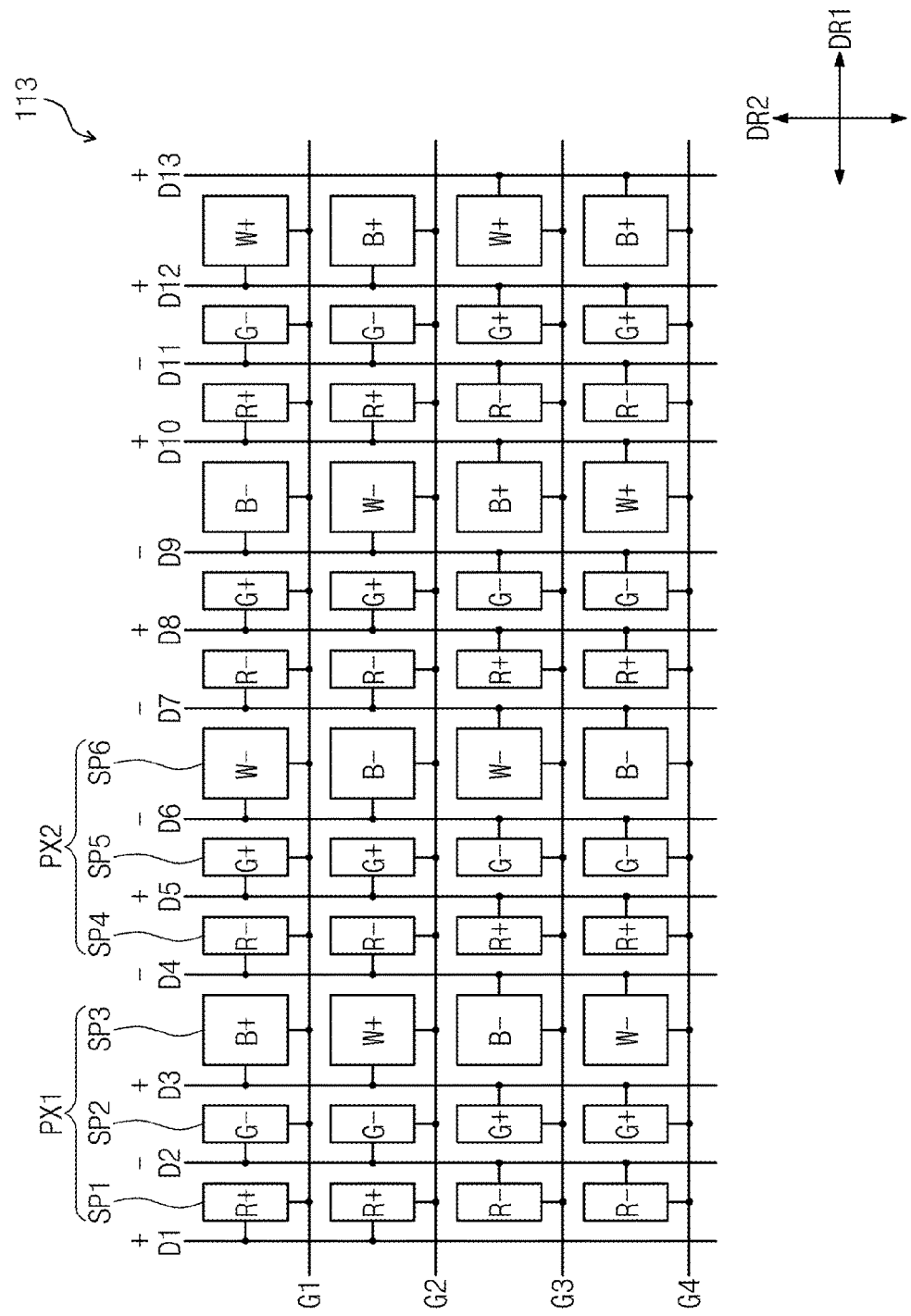
Figure 21:
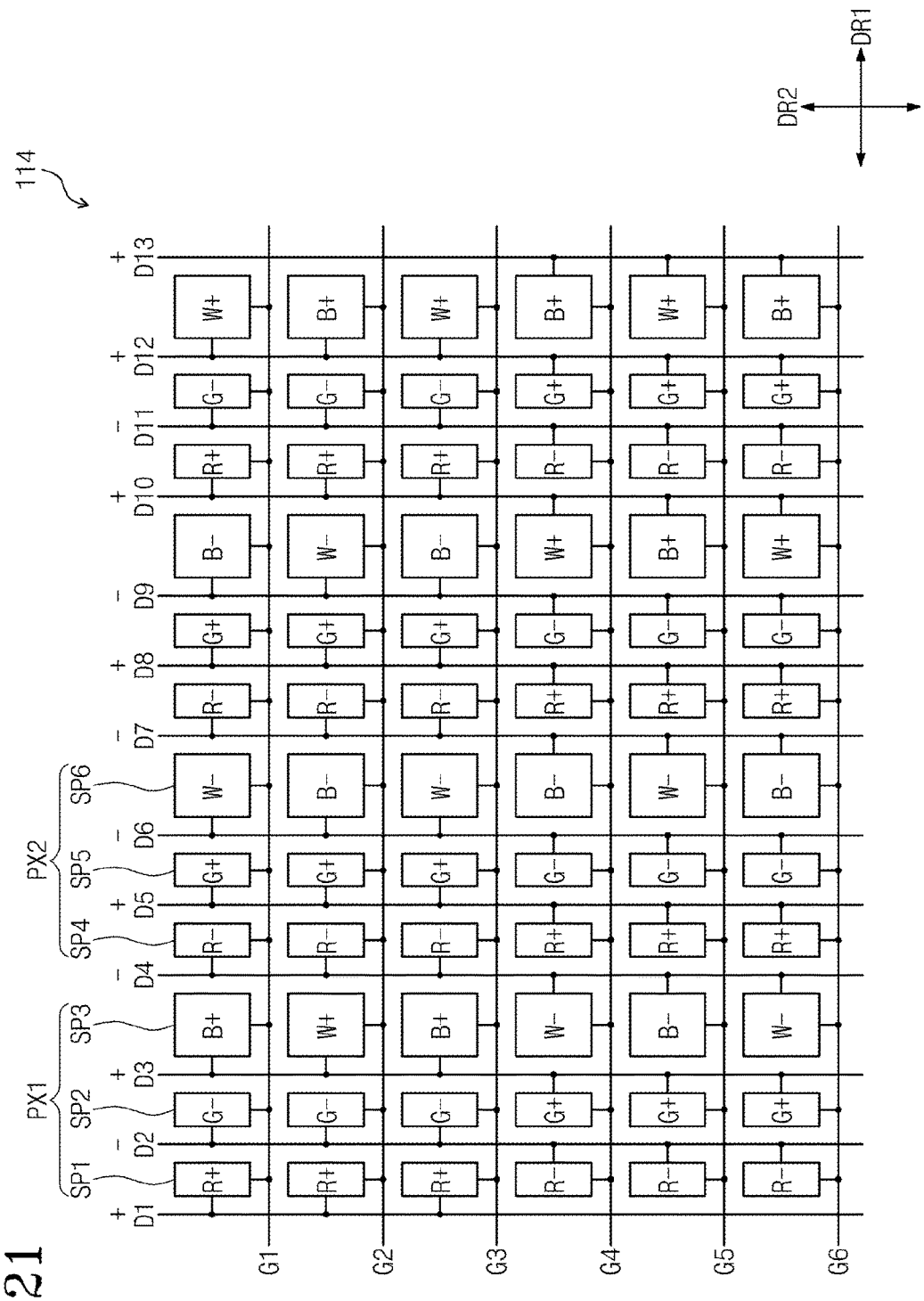
Figure 22:
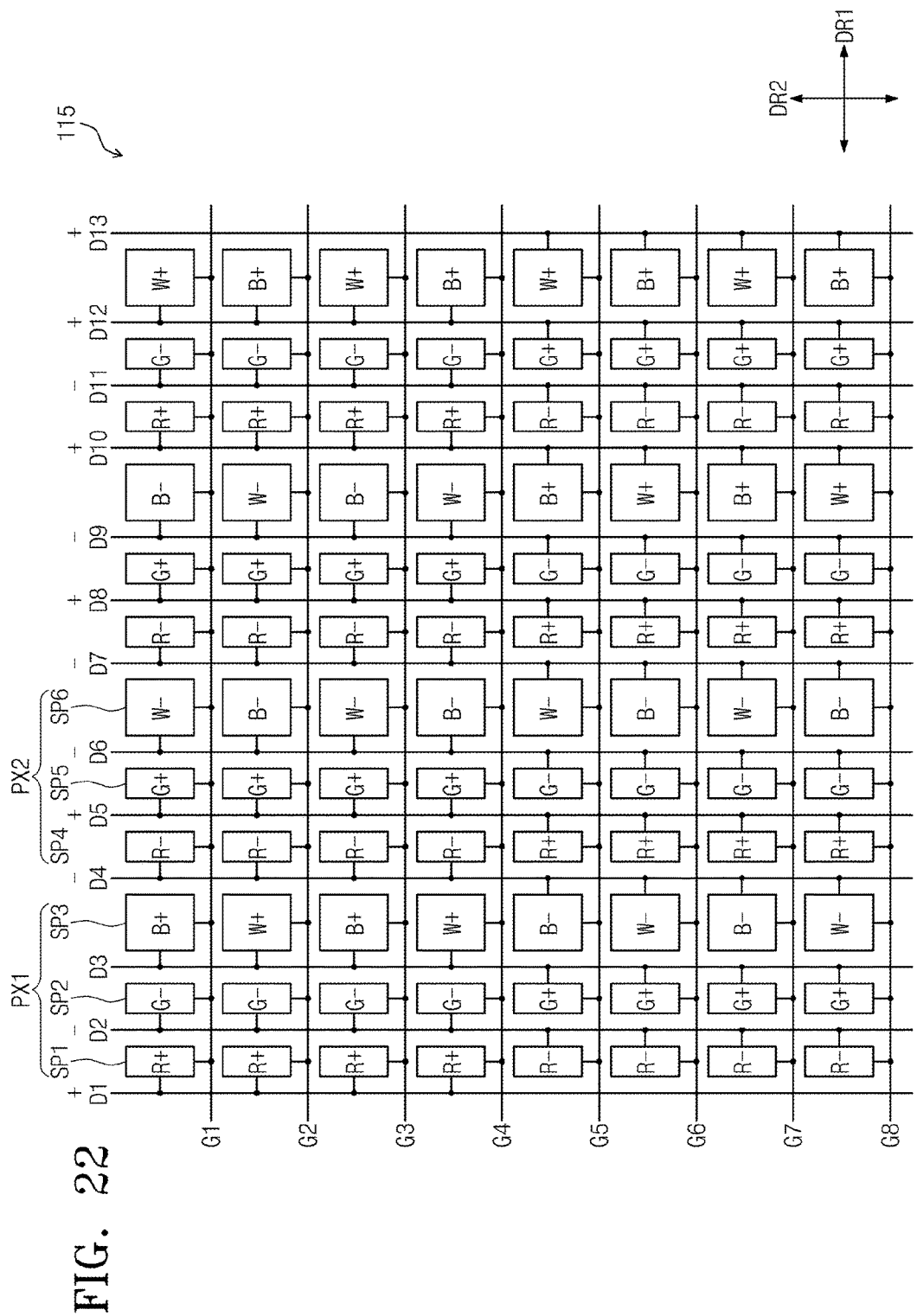

The liquid crystal display panel 112 shown in FIG. 19 has substantially the same structure and function as those of the liquid crystal display panel 100 shown in FIG. 3 except for the polarities of the data voltages applied to the first to thirteenth data lines D1 to D13. The liquid crystal display panel 113 shown in FIG. 20 has substantially the same structure and function as those of the liquid crystal display panel 101 shown in FIG. 8 except for the polarities of the data voltages applied to the first to thirteenth data lines D1 to D13. The liquid crystal display panel 114 shown in FIG. 21 has substantially the same structure and function as those of the liquid crystal display panel 102 shown in FIG. 9 except for the polarities of the data voltages applied to the first to thirteenth data lines D1 to D13. The liquid crystal display panel 115 shown in FIG. 22 has substantially the same structure and function as those of the liquid crystal display panel 103 shown in FIG. 10 except for the polarities of the data voltages applied to the first to thirteenth data lines D1 to D13.

Figure 23:
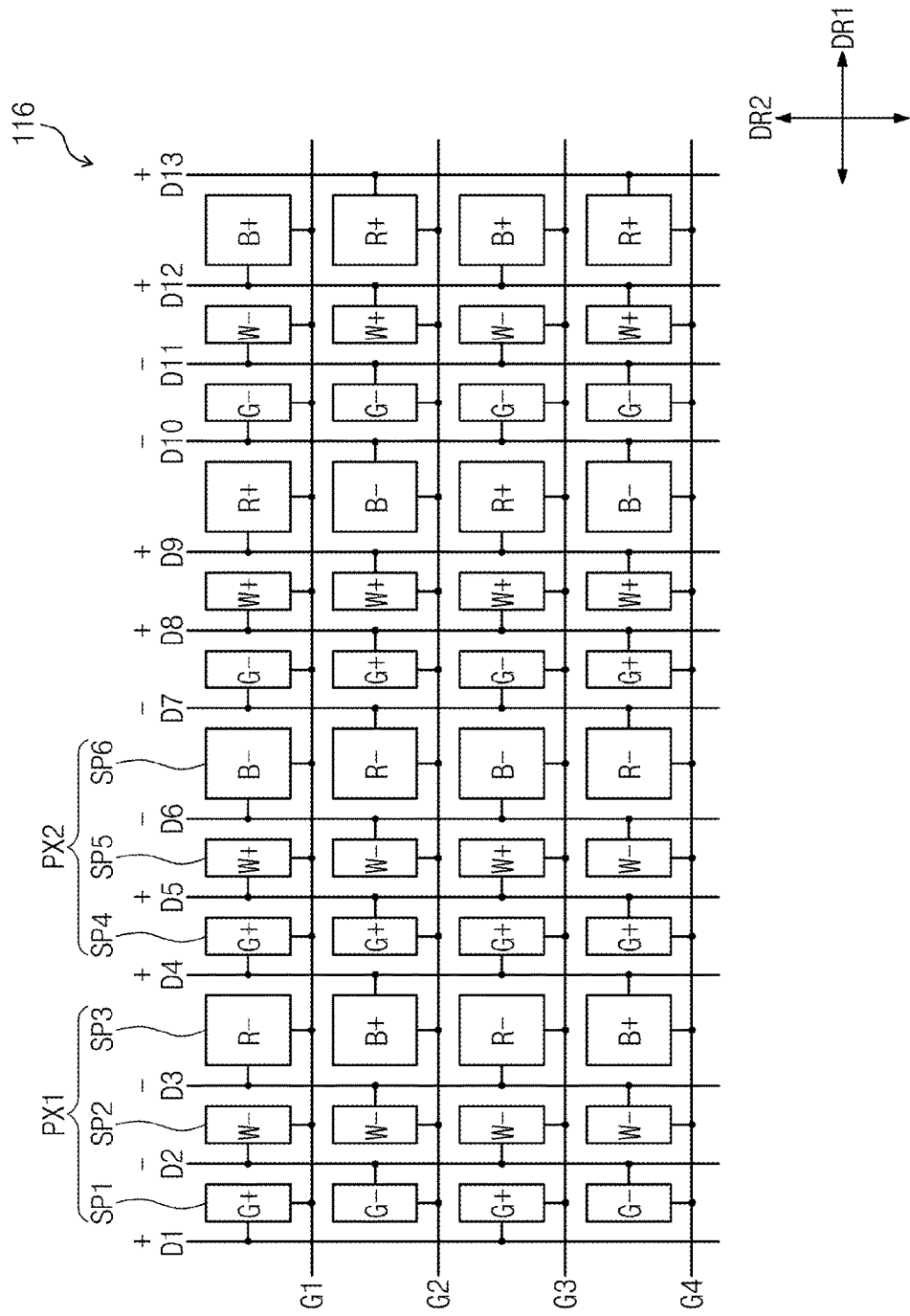

FIG. 23 is a plan view showing a portion of a liquid crystal display panels 116 according to exemplary embodiments.

The liquid crystal display panel 116 shown in FIG. 23 is similar to the liquid crystal display panel 100 shown in FIG. 3 except for the colors of the pixels. Hereinafter, different features of the liquid crystal display panel 116 will be mainly described when compared to the liquid crystal display panel 100 shown in FIG. 3.

In the liquid crystal display panel 116 shown in FIG. 23, each of the first and fourth sub-pixels SP1 and SP4 is the green sub-pixel, each of the second and fifth sub-pixels SP2 and SP5 is the white sub-pixel, the third sub-pixel SP3 is the red sub-pixel, and the sixth sub-pixel SP6 is the blue sub-pixel. Each of the red and blue sub-pixels have a width greater than that of each of the green and white sub-pixels in the first direction DR1, but this embodiment should not be limited thereto. Instead, the positions of the green and white sub-pixels may be changed with respect to each other. For instance, according to another embodiment, each of the first and fourth sub-pixels SP1 and SP4 is the white sub-pixel and each of the second and fifth sub-pixels SP2 and SP5 is the green sub-pixel.

The liquid crystal display panel 116 shown in FIG. 23 has different color arrangements from those of the sub-pixels of the liquid crystal display panel 100. The color arrangements of the sub-pixels of the liquid crystal display panel 116 shown in FIG. 23 may be applied to the liquid crystal display panels 101, 102, 103, 104, 105, 106, 107, 108, 109, 110, 11, 112, 113, 114, and 115 respectively shown in FIGS. 8, 9, 10, 11, 12, 13, 14, 15, 16, 17, 18, 19, 20, 21, and 22. More specifically, the first, second, third, fourth, fifth, and sixth sub-pixels SP1, SP2, SP3, SP4, SP5, and SP6 may be the green sub-pixel, the white sub-pixel, the red sub-pixel, the green sub-pixel, the white sub-pixel, and the blue sub-pixel, respectively, in each of the liquid crystal display panels 101, 102, 103, 104, 105, 106, 107, 108, 109, 110, 11, 112, 113, 114, and 115 respectively shown in FIGS. 8, 9, 10, 11, 12, 13, 14, 15, 16, 17, 18, 19, 20, 21, and 22.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus comprising:
   a plurality of gate lines extending in a first direction;
   a plurality of data lines extending in a second direction crossing the first direction and configured to receive polarities of data voltages consecutively repeated every four data lines; and
   a plurality of pixels each comprising three sub-pixels, wherein:
   one sub-pixel of the three sub-pixels has a width in the first direction different from a width of another sub-pixel of the three sub-pixels in the first direction,
   each of the three sub-pixels is connected to a corresponding gate line of the plurality of gate lines and a corresponding data line of the plurality of data lines,
   the polarities of the data voltages applied to a first data line and a third data line of the four data lines are opposite polarities and the polarities of the data voltages applied to a second data line and a fourth data line of the four data lines are opposite polarities, and
   the pixels arranged between two adjacent data lines among the plurality of data lines are alternately connected to the two adjacent data lines,
   wherein the plurality of pixels comprise:
   a first pixel and a second pixel disposed adjacent to the first pixel in at least one of the first and second direction,
   wherein:
   the first pixel comprises a first sub-pixel, a second sub-pixel, and a third sub-pixel arranged sequentially, the first sub-pixel has substantially a same width as the second sub-pixel in the first direction, and the third sub-pixel has a width different from the first and second sub-pixels in the first direction,
   the second pixel comprises a fourth sub-pixel, a fifth sub-pixel, and a sixth sub-pixel arranged sequentially, the fourth sub-pixel has substantially a same width as the fifth sub-pixel in the first direction, and the sixth sub-pixel has a width different from the fourth and fifth sub-pixels in the first direction, and
   wherein:
   each of the first and fourth sub-pixels is a green sub-pixel,
   each of the second and fifth sub-pixels is a white sub-pixel, and
   the third sub-pixel is a red sub-pixel, and the sixth sub-pixel is a blue sub-pixel.

2. The display apparatus of claim 1, wherein the first and second pixels are alternately arranged in the first and second directions.

3. The display apparatus of claim 1, wherein:
   each of the first, second, fourth, and fifth sub-pixels has a first width in the first direction,
   each of the third and sixth sub-pixels has a second width in the first direction and the second width of the third and sixth sub-pixels is two times greater than the first width of the first, second, fourth, and fifth sub-pixels.

4. The display apparatus of claim 1, wherein the polarities of the data voltages respectively applied to the four data lines are at least one of (+, −, and +), (−, +, +, and −), (+, +, −, and −), and (−, +, and +).

5. The display apparatus of claim 1, wherein the pixels arranged between the two adjacent data lines are alternately connected to the two adjacent data lines in at least one of a unit of one pixel, a unit of two pixels, a unit of three pixels, and a unit of four pixels.

6. The display apparatus of claim 1, wherein, among the sub-pixels connected to one gate line and displaying a first color, a number of the sub-pixels applied with a positive data voltage is equal to a number of the sub-pixels applied with a negative data voltage.

7. The display apparatus of claim 1, wherein, among the sub-pixels connected to one gate line and displaying a first color, two adjacent sub-pixels in the first direction receive data voltages having the same polarity.

* * * * *